US012150476B2

(12) United States Patent
Atchley et al.

(10) Patent No.: US 12,150,476 B2
(45) Date of Patent: Nov. 26, 2024

(54) FABRIC HAVING TOBACCO ENTANGLED WITH STRUCTURAL FIBERS

(71) Applicant: Altria Client Services LLC, Richmond, VA (US)

(72) Inventors: Frank Scott Atchley, Midlothian, VA (US); James M. Rossman, Richmond, VA (US); Munmaya K. Mishra, Manakin Sabot, VA (US)

(73) Assignee: Altria Client Services LLC, Richmond, VA (US)

( * ) Notice: Subject to any disclaimer, the term of this patent is extended or adjusted under 35 U.S.C. 154(b) by 43 days.

(21) Appl. No.: 18/064,516

(22) Filed: Dec. 12, 2022

(65) Prior Publication Data

US 2023/0105840 A1    Apr. 6, 2023

Related U.S. Application Data

(60) Continuation of application No. 16/919,590, filed on Jul. 2, 2020, now Pat. No. 11,540,560, which is a
(Continued)

(51) Int. Cl.
*A24F 23/02* (2006.01)
*A24B 13/00* (2006.01)
(Continued)

(52) U.S. Cl.
CPC .............. *A24F 23/02* (2013.01); *A24B 13/00* (2013.01); *A24B 15/28* (2013.01); *B32B 5/022* (2013.01);
(Continued)

(58) Field of Classification Search
None
See application file for complete search history.

(56) References Cited

U.S. PATENT DOCUMENTS 2,580,609 A   1/1952   Schur et al.
2,734,509 A   2/1956   Jurgensen, Jr.
(Continued)

FOREIGN PATENT DOCUMENTS

CN   101222861 A   7/2008
CN   101272703 A   9/2008
(Continued)

OTHER PUBLICATIONS

"Air Knife-Wikipedia, the free encyclopedia," 27, Jan. 14, XP055196211, Retrieved from the Internet: URL: http/web.archive.org/web/20140127191900/http://en.wikipedia.org/wiki/Air_knife [retrieved on Jun. 16, 2015] the whole document.
(Continued)

*Primary Examiner* — Dennis R Cordray
(74) *Attorney, Agent, or Firm* — Harness, Dickey & Pierce, P.L.C.

(57) ABSTRACT

A smokeless tobacco product includes smokeless tobacco and structural fibers. The structural fibers forming a network in which the smokeless tobacco is entangled. The structural fibers have a composition different from the smokeless tobacco. The tobacco-entangled fabric can have an overall oven volatiles content of at least 10 weight percent. In some embodiments, the structural fibers form a nonwoven network. In some embodiments, fibrous structures of the smokeless tobacco are entangled with the structural fibers.

19 Claims, 19 Drawing Sheets

Related U.S. Application Data continuation of application No. 16/599,278, filed on Oct. 11, 2019, now Pat. No. 10,736,354, which is a continuation of application No. 15/728,685, filed on Oct. 10, 2017, now Pat. No. 10,448,669, which is a division of application No. 14/719,763, filed on May 22, 2015, now Pat. No. 9,814,261, which is a continuation of application No. 13/197,990, filed on Aug. 4, 2011, now Pat. No. 9,066,540.

(60) Provisional application No. 61/452,402, filed on Mar. 14, 2011, provisional application No. 61/371,044, filed on Aug. 5, 2010, provisional application No. 61/371,036, filed on Aug. 5, 2010.

(51) Int. Cl.

| | |
|---|---|
| A24B 15/28 | (2006.01) |
| B32B 5/02 | (2006.01) |
| B32B 5/06 | (2006.01) |
| B32B 5/26 | (2006.01) |
| B32B 7/04 | (2019.01) |
| B32B 9/02 | (2006.01) |
| B32B 9/04 | (2006.01) |
| D01F 2/00 | (2006.01) |
| D04H 1/04 | (2012.01) |
| D04H 1/42 | (2012.01) |
| D04H 1/425 | (2012.01) |
| D04H 1/4258 | (2012.01) |
| D04H 1/4291 | (2012.01) |
| D04H 1/4374 | (2012.01) |
| D04H 1/4382 | (2012.01) |
| D04H 1/46 | (2012.01) |
| D04H 1/48 | (2012.01) |
| D04H 1/49 | (2012.01) |
| D04H 1/492 | (2012.01) |
| D04H 1/498 | (2012.01) |
| D04H 1/728 | (2012.01) |
| D04H 3/005 | (2012.01) |
| D04H 3/105 | (2012.01) |
| D04H 3/11 | (2012.01) |
| D04H 3/16 | (2006.01) |
| D04H 5/02 | (2012.01) |
| D04H 5/03 | (2012.01) |
| D04H 5/08 | (2012.01) |
| D06M 13/00 | (2006.01) |
| D06M 101/06 | (2006.01) |

(52) U.S. Cl.
CPC ............ *B32B 5/06* (2013.01); *B32B 5/26* (2013.01); *B32B 7/04* (2013.01); *B32B 9/02* (2013.01); *B32B 9/047* (2013.01); *D01F 2/00* (2013.01); *D04H 1/04* (2013.01); *D04H 1/42* (2013.01); *D04H 1/425* (2013.01); *D04H 1/4258* (2013.01); *D04H 1/4291* (2013.01); *D04H 1/4374* (2013.01); *D04H 1/43838* (2020.05); *D04H 1/46* (2013.01); *D04H 1/48* (2013.01); *D04H 1/49* (2013.01); *D04H 1/492* (2013.01); *D04H 1/498* (2013.01); *D04H 1/728* (2013.01); *D04H 3/005* (2013.01); *D04H 3/105* (2013.01); *D04H 3/11* (2013.01); *D04H 3/16* (2013.01); *D04H 5/02* (2013.01); *D04H 5/03* (2013.01); *D04H 5/08* (2013.01); *D06M 13/00* (2013.01); *D06M 13/005* (2013.01); *B32B 2255/02* (2013.01); *B32B 2262/0223* (2013.01); *B32B 2262/0238* (2013.01); *B32B 2262/0246* (2013.01); *B32B 2262/0253* (2013.01); *B32B 2262/0261* (2013.01); *B32B 2262/0276* (2013.01); *B32B 2262/04* (2013.01); *B32B 2262/062* (2013.01); *B32B 2262/065* (2013.01); *B32B 2262/12* (2013.01); *B32B 2262/14* (2013.01); *B32B 2307/7163* (2013.01); *B32B 2307/732* (2013.01); *B32B 2307/734* (2013.01); *B32B 2307/75* (2013.01); *D04H 1/43828* (2020.05); *D04H 1/43832* (2020.05); *D06M 2101/06* (2013.01)

(56) References Cited

U.S. PATENT DOCUMENTS

| | | |
|---|---|---|
| 3,354,863 A | 11/1967 | Reynolds et al. |
| 3,978,185 A | 8/1976 | Buntin et al. |
| 4,084,627 A | 4/1978 | Focke et al. |
| 4,090,521 A | 5/1978 | Elsner |
| 4,380,570 A | 4/1983 | Schwarz |
| 4,405,688 A | 9/1983 | Lowery et al. |
| 4,516,590 A | 5/1985 | Teng |
| 4,526,733 A | 7/1985 | Lau |
| 4,528,993 A | 7/1985 | Sensabaugh, Jr. et al. |
| 4,660,577 A | 4/1987 | Sensabaugh et al. |
| 4,848,373 A | 7/1989 | Lenkey |
| 4,940,464 A | 7/1990 | Van Gompel et al. |
| 4,987,907 A | 1/1991 | Townend |
| 5,063,104 A | 11/1991 | Robertson et al. |
| 5,146,955 A | 9/1992 | Steiner et al. |
| 5,372,149 A | 12/1994 | Roth et al. |
| 5,476,616 A | 12/1995 | Schwarz |
| 5,528,993 A | 6/1996 | Vincelli |
| 5,645,790 A | 7/1997 | Schwarz et al. |
| 6,013,223 A | 1/2000 | Schwarz |
| 6,207,601 B1 | 3/2001 | Maurer et al. |
| 6,455,030 B2 | 9/2002 | Saito et al. |
| 6,503,856 B1 | 1/2003 | Broadway et al. |
| 6,716,498 B2 | 4/2004 | Curro et al. |
| 7,156,937 B2 | 1/2007 | Provost et al. |
| 7,465,366 B2 | 12/2008 | Provost et al. |
| 7,547,469 B2 | 6/2009 | Provost et al. |
| 7,562,426 B2 | 7/2009 | Barker et al. |
| 7,666,261 B2 | 2/2010 | Bailey et al. |
| 7,718,556 B2 | 5/2010 | Matsuda et al. |
| 7,810,507 B2 | 10/2010 | Dube et al. |
| 9,386,800 B2 | 7/2016 | Sebastian et al. |
| 2001/0022988 A1 | 9/2001 | Schwarz et al. |
| 2004/0038022 A1 | 2/2004 | Maugans et al. |
| 2004/0038790 A1 | 2/2004 | Pehmoller et al. |
| 2004/0118421 A1 | 6/2004 | Hodin et al. |
| 2004/0118422 A1 | 6/2004 | Lundin et al. |
| 2004/0209540 A1 | 10/2004 | Schwarz |
| 2005/0056956 A1 | 3/2005 | Zhao et al. |
| 2005/0178398 A1 | 8/2005 | Breslin et al. |
| 2005/0196580 A1 | 9/2005 | Provost et al. |
| 2005/0196583 A1 | 9/2005 | Provost et al. |
| 2005/0217092 A1 | 10/2005 | Barker et al. |
| 2005/0244521 A1 | 11/2005 | Strickland |
| 2005/0255768 A1 | 11/2005 | Iwasaki et al. |
| 2006/0191548 A1 | 8/2006 | Strickland et al. |
| 2006/0264130 A1 | 11/2006 | Karles et al. |
| 2006/0292271 A1 | 12/2006 | King |
| 2007/0034220 A1 | 2/2007 | Pandolfino |
| 2007/0261707 A1 | 11/2007 | Winterson et al. |
| 2008/0209586 A1 | 8/2008 | Nielsen et al. |
| 2008/0302682 A1 | 12/2008 | Engstrom et al. |
| 2008/0305297 A1 | 12/2008 | Barker et al. |
| 2008/0308115 A1 | 12/2008 | Zimmermann |
| 2009/0126746 A1 | 5/2009 | Strickland et al. |
| 2009/0133703 A1 | 5/2009 | Strickland et al. |
| 2009/0162610 A1 | 6/2009 | Hwang |
| 2009/0189319 A1 | 7/2009 | Kim |
| 2009/0203280 A9 | 8/2009 | Provost et al. |
| 2009/0256277 A1 | 10/2009 | Brown et al. |
| 2009/0258099 A1 | 10/2009 | Brown et al. |
| 2009/0258562 A1 | 10/2009 | Brown et al. |

(56) References Cited

U.S. PATENT DOCUMENTS

| | | | |
|---|---|---|---|
| 2010/0018539 A1 | 1/2010 | Brinkley et al. |
| 2010/0018540 A1 | 1/2010 | Doolittle et al. |
| 2010/0018882 A1 | 1/2010 | St. Charles |
| 2010/0018883 A1 | 1/2010 | Patel |
| 2010/0170522 A1 | 7/2010 | Sun et al. |
| 2010/0218779 A1 | 9/2010 | Zhuang et al. |
| 2010/0242978 A1 | 9/2010 | Fuisz |
| 2010/0300465 A1 | 12/2010 | Zimmermann |
| 2010/0323573 A1 | 12/2010 | Chu et al. |
| 2011/0036364 A1 | 2/2011 | Pienemann et al. |
| 2011/0083688 A1 | 4/2011 | Mishra et al. |
| 2011/0220130 A1 | 9/2011 | Mua et al. |
| 2012/0024301 A1 | 2/2012 | Carroll et al. |
| 2012/0031414 A1 | 2/2012 | Atchley et al. |
| 2012/0031416 A1 | 2/2012 | Atchley et al. |
| 2012/0103353 A1 | 5/2012 | Sebastian et al. |

FOREIGN PATENT DOCUMENTS

| | | | |
|---|---|---|---|
| CN | 101495002 A | 7/2009 |
| CN | 101548797 A | 10/2009 |
| CN | 101873809 A | 10/2010 |
| CN | 103551046 A | 2/2014 |
| DE | 10346649 A1 | 5/2005 |
| EP | 0311364 A2 | 4/1989 |
| EP | 1990448 A2 | 11/2008 |
| EP | 2642556 A2 | 9/2013 |
| GB | 2373988 A | 10/2002 |
| JP | H04-91773 A | 3/1992 |
| JP | H05-255519 A | 10/1993 |
| JP | 2002-176964 A | 6/2002 |
| JP | 3872341 B2 | 1/2007 |
| JP | 2007-515950 A | 6/2007 |
| JP | 2009-203412 A | 9/2009 |
| JP | 2012/199034 A | 10/2012 |
| KR | 100857523 B1 | 9/2008 |
| WO | WO-1995/20432 A1 | 8/1995 |
| WO | WO-2001/51701 A1 | 7/2001 |
| WO | WO-05/046363 A2 | 5/2005 |
| WO | WO-2005/090653 A1 | 9/2005 |
| WO | WO-2005/115180 A1 | 12/2005 |
| WO | WO-07/37962 A1 | 4/2007 |
| WO | WO-2008/015573 A2 | 2/2008 |
| WO | WO-2009/010878 A2 | 1/2009 |
| WO | WO-2009/048522 A1 | 4/2009 |
| WO | WO-2009048606 A1 | 4/2009 |
| WO | WO-2009/063010 A2 | 5/2009 |
| WO | WO-2009/065459 A1 | 5/2009 |
| WO | WO-2010/078437 A1 | 7/2010 |
| WO | WO-2010/087921 A1 | 8/2010 |
| WO | WO-2011/117751 A2 | 9/2011 |
| WO | WO-2011/130414 A1 | 10/2011 |

OTHER PUBLICATIONS

International Preliminary Report on Patentability for PCT/US/2011/046636 mailed Feb. 14, 2013 (7 pages).
International Preliminary Report on Patentability for PCT/US2011/046625, mailed Feb. 14, 2013, 6 pages.
International Search Report and Written Opinion in International Application No. PCT/US2014/028242, mailed Jul. 15, 2014, 12 pages.
International Search Report and Written Opinion in International Application No. PCT/US2014/028325, dated Sep. 8, 2014, 12 pages.
International Search Report and Written Opinion in International Application No. PCT/US2014/028389, mailed Aug. 4, 2014 (9 pages).
International Search Report and Written Opinion in PCT/US2011/046636, amiled Apr. 12, 2012 (14 pages).
International Search Report and Written Opinion in PCT/US2011/046636, mailed Apr. 12, 2012, 14 pages.
International Search Report and Written Opinion in PCT/US2015/020449, mailed Sep. 7, 2015, 13 pages.
International Search Report and Written Opinion in PCT/US2011/046625, mailed Apr. 12, 2012, 12 pages.
International Search Report for Application No. PCT/US2015/020454, mailed Jun. 30, 2015, 15 pages.
Invitation to Pay Fees in International Application No. PCT/US2014/028584, mailed Sep. 9, 2014, six pages.
Rydholm, Pulping Processes, Interscience Publishers, pp. 51-52 (1967).
Tso, Chapter 1 in Tobacco, Production, Chemistry and Technology, 1999, Davis & Nielsen, eds. Blackwell Publishing, Oxford.
Yarin, et al. "Upward needleless electrospinning of multiple nanofibers," Polymer, Elsevier Science Publishers B.V., GB, vol. 45, No. 9, Apr. 1, 2004, pp. 2977-2980, XP004499264, ISSN: 0032-3861, DOI: 10.1016/J.Poly,er.2004.02.066 the whole document.
Indian Office Action for corresponding Application No. 1758/CHENP/2013 dated Nov. 30, 2018, English translation thereof.
Chinese Office Action issued Mar. 18, 2019 in corresponding application CN 201710941967.3, filed Oct. 11, 2017. English Translation. 24 pages.
Chinese Office Action issued Mar. 18, 2019 in corresponding application CN 201710941967.3, filed Oct. 11, 2017. 10 pages.
Chinese Office Action issued Oct. 29, 2019 in corresponding application CN 201710941967.3, filed Oct. 11, 2017. English Translation. 9 pages.
De Rosa et al "Structure and Properties of Elastomeric Polypropylene from C2 and C2v-Symmetric Zirconocenes. The Origin of Crystallinity and Elastic Properties in Poorly Isotactic Polypropylene," Macromolecules 2004, 37,6843-6855. (Year: 2004).
Chinese Office Action for corresponding Application No. 201710941967.3, dated Apr. 23, 2020, English translation thereof.

FABRIC HAVING TOBACCO ENTANGLED WITH STRUCTURAL FIBERS

CROSS-REFERENCE TO RELATED APPLICATIONS

This application is a continuation of U.S. application Ser. No. 16/919,590, filed Jul. 2, 2020, which is a continuation of U.S. application Ser. No. 16/599,278, filed Oct. 11, 2019, which is a continuation of U.S. application Ser. No. 15/728,685, filed Oct. 10, 2017, which is a divisional of U.S. application Ser. No. 14/719,763, filed May 22, 2015, which is a continuation of U.S. application Ser. No. 13/197,990, filed Aug. 4, 2011, which claims priority to U.S. Provisional Application Ser. No. 61/371,036, filed Aug. 5, 2010; U.S. Provisional Application Ser. No. 61/371,044, filed on Aug. 5, 2010; and U.S. Provisional Application Ser. No. 61/452,402, filed Mar. 14, 2011, the entire contents of each of which are incorporated herein by reference.

TECHNICAL FIELD

This disclosure generally relates to a smokeless tobacco product including smokeless tobacco entangled with structural fibers to form a tobacco-entangled fabric. Methods of making and using the tobacco-entangled fabric are also described.

BACKGROUND

Smokeless tobacco is tobacco that is placed in the mouth and not combusted. There are various types of smokeless tobacco including: chewing tobacco, moist smokeless tobacco, snus, and dry snuff. Chewing tobacco is coarsely divided tobacco leaf that is typically packaged in a large pouch-like package and used in a plug or twist. Moist smokeless tobacco is a moist, more finely divided tobacco that is provided in loose form or in pouch form and is typically packaged in round cans and used as a pinch or in a pouch placed between an adult tobacco consumer's cheek and gum. Snus is a heat treated smokeless tobacco. Dry snuff is finely ground tobacco that is placed in the mouth or used nasally.

SUMMARY

A smokeless tobacco product is described that includes a smokeless tobacco material and structural fibers of a material having a composition different from the smokeless tobacco. The structural fibers form a network in which the smokeless tobacco is entangled to form a tobacco-entangled fabric. The tobacco-entangled fabric can have an overall oven volatiles content of at least 10 weight percent. In some embodiments, the structural fibers form a nonwoven network. In some embodiments, fibrous structures of the smokeless tobacco are entangled with the structural fibers. A method of preparing the smokeless tobacco product is also described. The method includes bringing smokeless tobacco into contact with structural fibers and entangling the smokeless tobacco and the structural fibers to form a tobacco-entangled fabric. The tobacco-entangled fabric can have an overall oven volatiles content of at least 10 weight percent.

A packaged smokeless tobacco product can include a container that defines a moisture-tight interior space and at least one piece of the tobacco-entangled fabric described herein disposed in the moisture-tight interior space.

A method of using the smokeless tobacco product is also described. The method includes opening a container containing at least one tobacco-entangled fabric described herein, removing at least a piece of the at least one tobacco-entangled fabric, and placing the removed piece in an adult tobacco consumer's mouth. Some embodiments of a smokeless tobacco product can include a tobacco-entangled fabric in which smokeless tobacco is needled with fibers (e.g. cotton, polyester, viscose or the like) so that the smokeless tobacco is secured within the structural fibers but still exposed on an exterior surface of the tobacco-entangled fabric. Further, some systems described can include a plurality of pieces of tobacco-entangled fabric packaged into a container where each piece has a substantially similar shape and provides a substantially similar, predetermined portion of tobacco. Such a system can permit an adult tobacco consumer to receive a consistent portion of tobacco (e.g., with each placement of article smokeless tobacco product in the mouth) while also experiencing the tactile and flavor benefits of having the smokeless tobacco externally exposed on the tobacco-entangled fabric (e.g., not impeded by a pouch or pouch materials).

In one aspect, a system is provided. Such a system typically includes a container including a lid and a base that defines an interior space and a plurality of pieces of needled tobacco-entangled fabric. Each of the pieces has a substantially similar shape and a substantially similar portion of smokeless tobacco.

In some embodiments, the smokeless tobacco is exposed along at least one exterior surface of the tobacco-entangled fabric. In certain embodiments, each of the tobacco-entangled fabric pieces includes multiple layers of fibers. In certain embodiments, each piece of tobacco-entangled fabric includes one or more flavor strips applied to one or more exterior surfaces of each piece. In certain embodiments, each piece of tobacco-entangled fabric comprises a design embossed or stamped on one or more exterior surfaces.

The smokeless tobacco can be a dry or moist smokeless tobacco. In some embodiments, the smokeless tobacco is moist smokeless tobacco having an oven volatile content of about 30% by weight to about 61% by weight. In other embodiments, the smokeless tobacco is a dry snuff having an oven volatile content of between 2% and 15%. In some embodiments, the smokeless tobacco is a snus having an oven volatile content of between 15% and 57%. In some embodiments, the tobacco-entangled fabric has an overall oven volatile content of about 4% by weight to about 61% by weight. In certain embodiments, the structural fibers are cotton. In some embodiments, the structural fibers are obtained from a 2.9 oz. cotton batting. In certain embodiments, the tobacco-entangled fabric comprises multiple layers of structural fibers. In certain embodiments, the tobacco-entangled fabric comprises multiple layers of smokeless tobacco. In some embodiments, the tobacco-entangled fabric further comprises a backing material. A representative backing material is a scrim.

The tobacco-entangled fabric can be flavored. In some embodiments, the tobacco-entangled fabric is cut to shape. Representative shapes include, without limitation, elliptical, elongated elliptical, semi-circular, square, rectangular, elongated rectangular, rounded-edge rectangular, football-shaped, boomerang-shaped, teardrop-shaped, comma-shaped, bowtie-shaped, or peanut-shaped. In some embodiments, pieces of the tobacco-entangled fabric are embossed. In some embodiments, the tobacco-entangled fabric is perforated.

In still another aspect, a needling method of making tobacco-entangled fabric for use in the mouth is provided. Such a method typically includes needling smokeless tobacco with structural fibers such that the tobacco is secured within the fibers. In some embodiments, the puncture density is between about 100 ppsi (penetrations per square inch) and about 2000 ppsi (e.g., between about 400 ppsi and about 800 ppsi).

In yet another aspect, a needling method of making a tobacco-entangled fabric is provided. Such a method typically includes placing a layer of smokeless tobacco on a layer of backing material; placing a layer of structural fibers on the layer of tobacco particles; and needling the smokeless tobacco with the structural fibers using needles that drag the structural fibers through the tobacco's fibrous structures, thereby producing a tobacco-entangled fabric. Such a method can further include placing a second layer of smokeless tobacco on the tobacco-entangled fabric; placing a second layer of structural fibers on the second layer of smokeless tobacco; and needling the second layer of smokeless tobacco with the second layer of structural fibers and the tobacco-entangled fabric. In some embodiments, such a method can further include passing the needled tobacco material through a nip to form the tobacco-entangled fabric.

In some embodiments, the layer of backing material is a scrim. In some embodiments, the method further includes removing the layer of backing material from the tobacco-entangled fabric following the needling step.

In certain embodiments, the method further includes printing a pattern on the exterior of a piece of tobacco-entangled fabric. In certain embodiments, the method further includes embossing the exterior of the tobacco-entangled fabric. In some embodiments, the method further includes flavoring the structural fibers or the tobacco-entangled fabric. In certain embodiments, the method further includes cutting the tobacco-entangled fabric to shape. In some embodiments, the method further includes perforating the tobacco-entangled fabric.

In another aspect, an article of manufacture is provided. Such an article of manufacture typically includes a cylindrical container comprising a plurality of pieces of needled tobacco-entangled fabric sealed therein, wherein the needled tobacco-entangled fabric includes smokeless tobacco needled with structural fibers.

The products and methods described herein can also be applied to other orally consumable plant materials in addition to smokeless tobacco. For example, some non-tobacco or "herbal" compositions have also been developed as an alternative to smokeless tobacco compositions. Non-tobacco products may include a number of different primary ingredients, including but not limited to, tea leaves, red clover, coconut flakes, mint leaves, *ginseng*, apple, corn silk, grape leaf, and basil leaf. In some embodiments, a non-tobacco product includes a non-tobacco material having fibrous structures and structural fibers of a material having a composition different from the non-tobacco material. The structural fibers form a nonwoven network in which the fibrous structures of the non-tobacco material are entangled to form a non-tobacco plant-entangled fabric. In some embodiments, a non-tobacco plant-entangled fabric is made by bringing non-tobacco plant fibrous structures into contact with structural fibers and entangling the non-tobacco fibrous structures and the structural fibers to form a non-tobacco plant-entangled fabric. In some embodiments, a non-tobacco smokeless product includes non-tobacco fibrous structures entangled with structural fibers and one or more tobacco extracts. Tobacco extracts added to a non-tobacco plant-entangled fabric can result in a non-tobacco product providing a desirable mouth feel and flavor profile. In some embodiments, the tobacco extracts can be extracted from a cured and/or fermented tobacco by mixing the cured and/or fermented tobacco with water and removing the non-soluble tobacco material. In some embodiments, the tobacco extracts can include nicotine. In some embodiments, the non-tobacco plant-entangled fabric includes an extract of tobacco including two or more tobacco organoleptic components.

Unless otherwise defined, all technical and scientific terms used herein have the same meaning as commonly understood by one of ordinary skill in the art to which the methods and compositions of matter belong. Although methods and materials similar or equivalent to those described herein can be used in the practice or testing of the methods and compositions of matter, suitable methods and materials are described below. In addition, the materials, methods, and examples are illustrative only and not intended to be limiting. All publications, patent applications, patents, and other references mentioned herein are incorporated by reference in their entirety.

DESCRIPTION OF DRAWINGS

FIGS. 15B and 15C show tobacco-entangled fabric pieces that have been embossed with a leaf image.

Like reference symbols in the various drawings indicate like elements.

DETAILED DESCRIPTION

Figure 1:
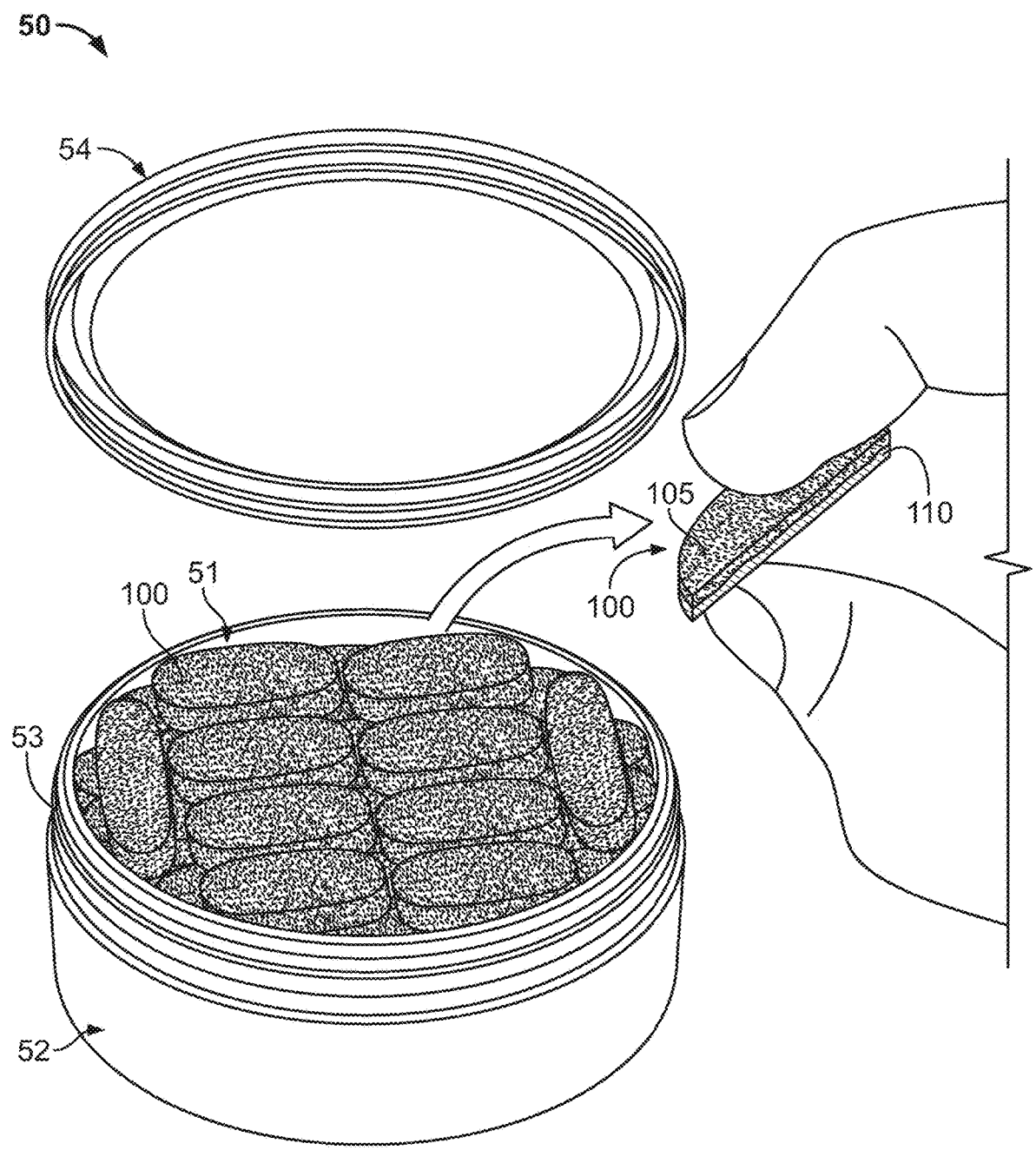
FIG. 1 is a perspective view of a packaging system including pieces of tobacco-entangled fabric.

This disclosure provides methods and materials for fabric products having smokeless tobacco entangled in structural fibers. The disclosure is based, in part, on the surprising discovery that entanglement of smokeless tobacco and structural fibers results in a smokeless tobacco product that, although it has tobacco exposed along its outer surfaces, has a reduced propensity for individual smokeless tobacco particles to disperse or float in the oral cavity. The tobacco-entangled fabric remains cohesive during use, and provides a unique tactile and flavor experience to an adult tobacco consumer. In addition, the methods described herein result in the production of tobacco-entangled fabric pieces that retain their shape and are less likely to break apart during packaging, handling, and shipping.

The tobacco-entangled fabric 100 can be entangling smokeless tobacco with structural fibers using a variety of woven and nonwoven technologies, either alone or in various combinations. Examples of these technologies are sometimes referred to by the following terms: melt-blowing, spun bonding, spun laying, spun lacing, hydroentangling, spun jetting, needling, needle punching, needle felting, thermal bonding, ultrasonic bonding, radiation bonding, chemical bonding, stitch bonding, quilting, weaving, dry laying, and wet laying. Some of these terms may overlap in meaning and/or include some of the same processing steps. Moreover, certain of these terms may sometimes be used interchangeably. Moreover, these processes can be used either alone or in various combinations to provide a desired entanglement of smokeless tobacco with structural fibers. As used herein, the term "structural fibers" refers to fibers that provide a network for retaining smokeless tobacco and enable the tobacco-entangled fabric to be cohesive when handled or placed within an adult tobacco consumer's mouth. The structural fibers can be entangled with fibrous structures of the smokeless tobacco such that the tobacco's fibrous structures wrap at least partially around one or more structural fibers.

In some embodiments, smokeless tobacco is placed adjacent structural fibers and then mechanically entangled with the structural fibers (e.g., by needling, needle punching, needle felting, spun lacing, or hydroentangling). In other embodiments, smokeless tobacco is mixed into structural fibers during processing steps of the structural fibers (e.g., during dry laying or wet laying process) or mixed into a stream of polymeric structural fibers as they are being spun (e.g., during a melt-blowing, spun bonding, or spun laying process). In some of these processes, the smokeless tobacco and the structural fibers may become sufficiently entangled to provide a tobacco-entangled fabric. However, additional processing techniques, such as needling, needle punching, needle felting, thermal bonding, ultrasonic bonding, radiation bonding, chemical bonding, stitch bonding, and/or quilting, may be used to further entangle or lock the smokeless tobacco into a network of the structural fibers. The resulting tobacco-entangled fabric can then be further processed and packaged as a number of different smokeless tobacco products. Although other methods of producing the tobacco-entangled fabric are also contemplated, various methods are discussed in more detail below.

In some embodiments, the structural fibers provide a nonwoven network for retaining the smokeless tobacco. As used herein, the term "nonwoven" means a material made from fibers that are connected by entanglement and/or bonded together by a chemical, heat or solvent treatment where the material does not exhibit the regular patterns of a woven or knitted fabric. In some embodiments, the structural fibers material are initially provided as a woven fabric (e.g., a loosely woven cotton fabric), but manipulated by entangling the smokeless tobacco such that the resulting tobacco-entangled fabric constitutes a nonwoven network due to a loss of order of the fibers.

The structural fibers 110 can be arranged such that the tobacco-entangled fabric is dimensionally stable. As used herein, "dimensionally stable" means that the fabric retains its shape under its own weight. In some embodiments, a piece of the tobacco-entangled fabric is flexible, yet can be picked up at one end without the force of gravity causing the piece to bend or sag.

Structural fibers can be natural fibers and/or synthetic fibers, which can be processed and/or produced using a variety of techniques, including some of the techniques discussed above. Although the structural fibers are not intended to provide tobacco components, certain structural fibers can absorb and desorb certain tobacco components when combined with the smokeless tobacco. Structural fibers, however, can also be coated with flavorants or other additives. In some embodiments, the structural fibers can modify the release of flavorants to provide a desired flavor release rate. In some embodiments, the structural fibers are reconstituted cellulosic fibers formed from tobacco plant tissue. In still other embodiments, structural fibers can include milled tobacco at least partially embedded into the structural fibers.

Exemplary Packaging System

Referring to FIG. 1, some embodiments of a smokeless tobacco system 50 can include one or more pieces of tobacco-entangled fabric 100 of structural fibers entangled with fibrous structures of smokeless tobacco 105. A plurality of pieces of tobacco-entangled fabric 100 can be arranged in an interior space 51 of a container 52 that mates with a lid 54. The interior space 51 can be moisture tight to prevent the tobacco-entangled fabric from drying out. The plurality of the articles 100 arranged in the container 52 can all have a substantially similar shape so that an adult tobacco consumer can conveniently select any of the similarly shaped tobacco-entangled fabric 100 therein for use in the mouth and receive a generally consistent portion of the smokeless tobacco 105. In other embodiments, the container 52 can include a strip of tobacco-entangled fabric and pieces of tobacco-entangled fabric can be separated from the strip and placed in an adult tobacco consumer's mouth for use in the mouth. In still other embodiments, the tobacco-entangled fabric can be incorporated into other types of smokeless tobacco products. Some embodiments of the tobacco-entangled fabric 100 can include a smokeless tobacco 105 homogeneously distributed throughout the network of the structural fibers 110. In other embodiments, the tobacco-entangled fabric 100 can include regions having different amounts of smokeless tobacco. For example, the tobacco-entangled fabric 100 can be a layered product having one or more layers primarily composed of structural fibers 110 and one or more layers primarily composed of smokeless tobacco 105, but with fibers from adjacent layers being entangled to form a cohesive tobacco-entangled fabric.

The container 52 and lid 54 can releasably mate at a connection rim 53 so as to maintain freshness and other product qualities of the tobacco-entangled fabric 100 contained therein. Such qualities may relate to, without limitation, texture, flavor, color, aroma, mouth feel, taste, ease of use, and combinations thereof. In some embodiments, the container is moisture-tight. Certain containers can be airtight. In particular, the container 52 may have a generally cylindrical shape and include a base and a cylindrical side wall that at least partially defines the interior space 53. The connection rim 53 formed on the container 52 provides a snap-fit engagement with the lid 54. It will be understood from the description herein that, in addition to the container 52, many other packaging options are available to hold tobacco-entangled fabric 100.

Method of Using the Tobacco-Entangled Fabric

In certain embodiments, each piece of tobacco-entangled fabric 100 can be configured for use in the mouth in a manner similar to that of an individual pouch containing smokeless tobacco therein. Unlike the typical individual pouch products, however, in which the paper or paper-like pouch material is in contact with the adult tobacco consumer's cheek and gum, the tobacco-entangled fabric 100 described herein can provide a desired tactile feel in an adult tobacco consumer's mouth. For example, the combination of the structural fibers and smokeless tobacco (including the tobacco's fibrous structures) can provide a softer mouth feel. Moreover, in certain embodiments, the structural fibers can be elastic or pliable (e.g., a polymeric polyurethane such as DESMOPAN DP 9370A available from Bayer) thus forming a tobacco-entangled fabric that can tolerate being "worked" in the mouth. For example, the tobacco-entangled fabric 100 can be worked to provide flavor and/or to comfortably conform between the cheek and gum. Furthermore, tobacco-entangled fabric 100 can provide direct tissue contact with some of the smokeless tobacco. Additionally, a piece of tobacco-entangled fabric remains cohesive and thus reduces the instances of substantial pieces of smokeless tobacco floating to an undesired location and/or position in the adult tobacco consumer's mouth. In some embodiments, combinations of mouth-stable and mouth-dissolvable fibers are combined with the smokeless tobacco to provide a product that becomes looser when placed in an adult tobacco consumer's mouth, yet remains cohesive. The structural fibers can also be a composite of multiple materials, which may include both mouth-stable and mouth-dissolvable materials.

Briefly, in use, the system 50 can be configured so that an adult tobacco consumer can readily grasp at least one piece of the tobacco-entangled fabric 100 for placement in the adult tobacco consumer's mouth, thereby receiving a predetermined portion of smokeless tobacco with each tobacco-entangled fabric 100. In some embodiments, the predetermined portion of smokeless tobacco is generally consistent with each piece of the tobacco-entangled fabric 100 stored in the container. For example, each piece can provide between 0.25 and 4.0 grams of smokeless tobacco. Accordingly, the system 50 can permit an adult tobacco consumer to receive consistent portions of smokeless tobacco with each delivery (e.g., placement of the piece of tobacco-entangled fabric 100 in the mouth). In some embodiments, an exterior surface includes a combination of structural fibers 110 and smokeless tobacco 105 to provide a unique tactile and flavor experience.

The container 52 and lid 54 can be separated from one another so that the adult tobacco consumer can have access to the one or more pieces of tobacco-entangled fabric 100 contained therein. Thereafter, the adult tobacco consumer can obtain a predetermined portion of smokeless tobacco 105 by readily grasping any one of the pieces of tobacco-entangled fabric 100 (e.g., without the need to estimate an amount of the smokeless tobacco) and can place the piece of tobacco-entangled fabric 100 in his or her mouth. The remaining pieces of the tobacco-entangled fabric 100 can be enclosed in the container 52 when the lid 54 is reengaged with the container 52. During use, the network of structural fibers can remain cohesive and thus reduce the likelihood of substantial portions of smokeless tobacco breaking away from the tobacco-entangled fabric and "floating" in the adult tobacco consumer's mouth. After the adult tobacco consumer has enjoyed the piece of tobacco-entangled fabric 100, the adult tobacco consumer can remove the tobacco-entangled fabric 100 from his or her mouth and discard it. In some embodiments, the container 52 has an additional receptacle for receiving used pieces of tobacco-entangled fabric.

Methods of Producing the Tobacco-Entangled Fabric

The structural fibers can be provided, processed, and/or produced using a number of methods. In some embodiments, the structural fibers material is initially provided as a fabric (either woven or nonwoven). In other embodiments, natural structural fibers can be obtained in raw form (e.g., cotton in bales) and processed to produce a non-cohesive web, which can be further processed to produce the cohesive tobacco-entangled fabric. In other embodiments, synthetic fibers can be purchased or spun in separate operations and then processed or manipulated to form a fabric and to entangle smokeless tobacco. Moreover, smokeless tobacco may be mixed with the structural fibers during any point in the various processes of processing, producing, and/or further manipulating the structural fibers to produce the tobacco-entangled fabric. As will be discussed below, various entangling and/or bonding techniques can be used to secure the structural fibers together such that the network of structural fibers retains the smokeless tobacco. Although various methods for creating a tobacco-entangled fabric 100 are described herein, other methods are also contemplated.

Processing of Preformed Structural Fibers

A tobacco-entangled fabric 100 can include preformed structural fibers. In some embodiments, preformed structural fibers (either natural or synthetic fiber) are dry laid or wet laid to provide an initial web of structural fibers. Synthetic fibers can be spun in a separate process or obtained from a merchant. This web of structural fiber can be cohesive or non-cohesive. In some embodiments, smokeless tobacco is mixed with the structural fibers during these processes. In other embodiments, smokeless tobacco can be mixed and entangled with a web of structural fibers after the web is produced.

Dry Laid Nonwoven Systems

A dry laid system can arrange preformed structural fibers into a web. The preformed structural fibers can be between 1.2 and 100 cm long. For example, the preformed structural fibers can be cotton. Natural cotton may be shipped to a manufacturing location in the form of bales. In some embodiments, smokeless tobacco can be mixed in with the structural fibers during bale processing, just prior to input into a web forming apparatus, or entangled with the structural fibers after the formation of the web of the preformed fibers using, for example, a needling process.

During a dry laid process, preformed fibers (e.g., cotton) can be mechanically and/or pneumatically processed from a bale to a point where the fibers can be introduced into a web-forming machine. A dry laid process can include the following steps: bale opening; blending; coarse opening; fine opening; and web-form feeding. During these processes, pins can be used to open fiber tufts in preparation for forming a web. Rolls can also reduce the tuft size by using the principle of carding points between the different rolls The opened fiber with the reduced tufts can be transferred via an air stream to a web-former. In some embodiments, smokeless tobacco is mixed with the opened fibers just before being fed into a web-former.

One dry laid method of forming a nonwoven web is carding. The carding process separates small tufts into individual fibers, begins to parallelize the fibers, and forms the fibers into a web. In the carding process, fibers are held by one surface while another surface combs the fibers causing individual fiber separation. A large rotating metallic cylinder covered with card clothing can be used to card preformed fibers. The card clothing can include needles, wires, or fine metallic teeth embedded in a heavy cloth or in a metallic foundation. The top of the cylinder may be covered by alternating rollers and stripper rolls in a roller-top card. The fibers, optionally mixed with smokeless tobacco, can be fed by a chute or hopper and condensed into the form of a lap or batting. Needles of the two opposing surfaces of the cylinder and flats or the rollers can be inclined in opposite directions and move at different speeds. The fibers are aligned in the machine direction and form a coherent web below the surface of the needles of the main cylinder. The web can be removed from the surface of cylinder and deposited on a moving belt.

Another dry laid method of forming a nonwoven web is garnetts. Garnetts uses a group of rolls placed in an order that allows a given wire configuration, along with certain speed relationships, to level, transport, comb and interlock fibers to a degree that a web is formed. Garnetts can deliver a more random web than carding.

An air-stream can also be used to orient the structural fibers in a carding or garnetts system. For example, starting with a lap or plied card webs fed by a feed roller, the fibers can be separated by a licker-in or spiked roller and introduced into an air-stream. The air-stream can randomize the fibers as they are collected on the condenser screen. The web can be delivered to a conveyor for transporting to a bonding area. In some embodiments, the length of fibers used in air-laying varies from 2 to 6 cm. In some embodiments, the air-stream also delivers a stream of smokeless tobacco to be mixed with the nonwoven fibers.

A centrifugal system can also be used to form a nonwoven web by throwing off fibers from the cylinder onto a doffer with fiber inertia, which is subject to centrifugal force. Orientation in the web is three-dimensional and is random or isotropic. In some embodiments, smokeless tobacco is added to the centrifugal system to be mixed with the structural fibers.

Web formations can be made into the desired web structure by the layering of the webs from either the card and/or garnetts. Layering techniques include longitudinal layering, cross layering, and perpendicular layering. In some embodiments, layers of smokeless tobacco are deposited between layers of carded or garneted preformed fibers. As will be discussed below, the nonwoven fabric can be further processed to entangle or interlock the preformed structural fibers of the web with each other and/or with smokeless tobacco. These processed include needling, needle punching, needle felting, stitch bonding, thermal bonding, ultrasonic bonding, radiation bonding, chemical bonding, air-jet entanglement, spun lace, and hydroentanglement.

Wet Laid Nonwoven Systems

In a wet laid web process, structural fibers are dispersed in an aqueous medium. Specialized paper machines can be used to separate the water from the fibers to form a uniform sheet of material, which is then bonded and dried. Wet laid Nonwoven Systems can have high production rate (up to 1000 m/min) and the ability to blend a variety of fibers from papermaking technology. Any natural or synthetic fiber could be used in the production of wet-laid nonwovens. For example, cotton linters, wood pulp, and cellulose structural fibers can be used in wet-laid process. Synthetic fibers (e.g., rayon, polyester) can be used and can provide thermobonding capabilities. Crimped fibers can make a very soft and bulky tobacco-entangled fabric. In some embodiments, the fibers are between 2 mm and 50 mm long. The wet-laid nonwoven system can use consistencies of between 0.005% and 0.05%. In some embodiments, smokeless tobacco is also suspended in the water with structural fibers.

After swelling and dispersion of the fibers in water, the mixing vats can be transported to the head box from where they are fed continuously into a web-laying machine. In some embodiments, smokeless tobacco is also added to the mixing vats prior to feeding the dispersion to the web-laying machine. The smokeless tobacco can be treated prior to adding them to the dispersion to retain moisture and flavors during the subsequent processing steps. For example, the smokeless tobacco can be encapsulated. In other embodiments, soluble tobacco components (e.g., flavorants) can be removed from the smokeless tobacco before adding the smokeless tobacco to the vat and can be added back to the smokeless tobacco after the wet laid process. Squeezing machines can be used to dehydrate the web. The web can then be dried and bonded. For example, convection, contact and radiation dryers can be used to both dry and bond the web.

Bonding agents can be added to the wet laid material to help bond the structure. For example, meltable fibers can also be used or added to the web for bonding and activated by a heating step either during drying, or during a later hot calendaring step. Examples of fibers of this type include vinyon, polypropylene, cellulose acetate, and special low melting polyester or polyamide copolymers. In other embodiments, beads of globules of meltable materials can be added during the dry laid process and activated by a heating step to result in spot bonding.

Other in-line treatments can include aperturing and water-jet entanglement. Apertures are regularly spaced holes, and can be selected for aesthetics or for performance (e.g., improving permeability to increase access to the smokeless tobacco throughout tobacco-entangled fabric when placed in an adult tobacco consumer's mouth). One method of aperturing uses a course forming wire, so that the sheet is formed around the protruding "knuckles" in a regular pattern. Another method uses high-pressure water showers and patterned cylinders to rearrange the fiber into the desired pattern, which can be used to entangle the fibers and/or create apertures. A process sometimes known as spun lace can use precise jets of high pressure water to hydroentangle the structural fibers with each other and/or with smokeless tobacco. Prior to hydroentanglement, soluble tobacco components can be removed from the smokeless tobacco and can be added back to the smokeless tobacco after the hydroentanglement process. Other processes, including those discussed below, can also be used with a web laid web to entangle smokeless tobacco and/or to bond the structural fibers such that the tobacco-entangled fabric is cohesive.

Production of Webs of Polymeric Structural Fibers

Polymer-based systems for producing polymeric structural fibers having a nonwoven structure include, for example, melt-blown systems and spun bond systems. Other systems for producing polymeric fibers include electro spinning and force spinning. Moreover, other systems for producing polymeric structural fibers are also contemplated.

Figure 2A:
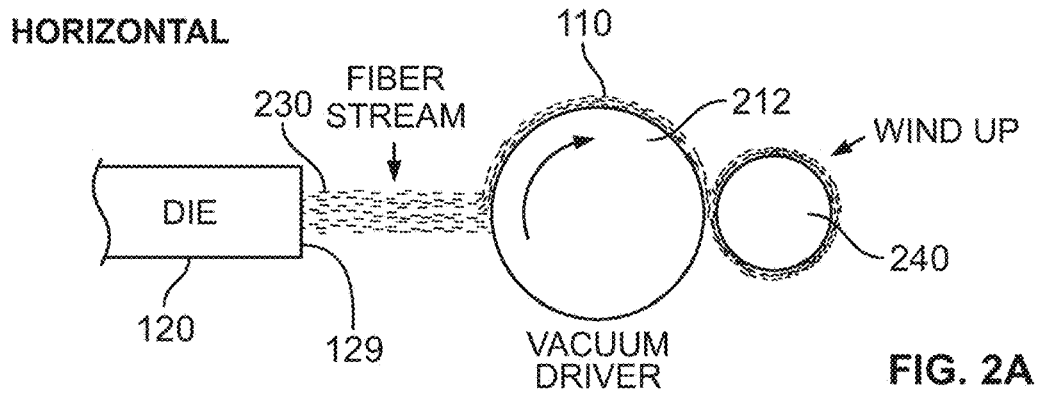
FIG. 2A is a schematic drawing of a horizontal melt-blowing or spun bond process.
Figure 2B:
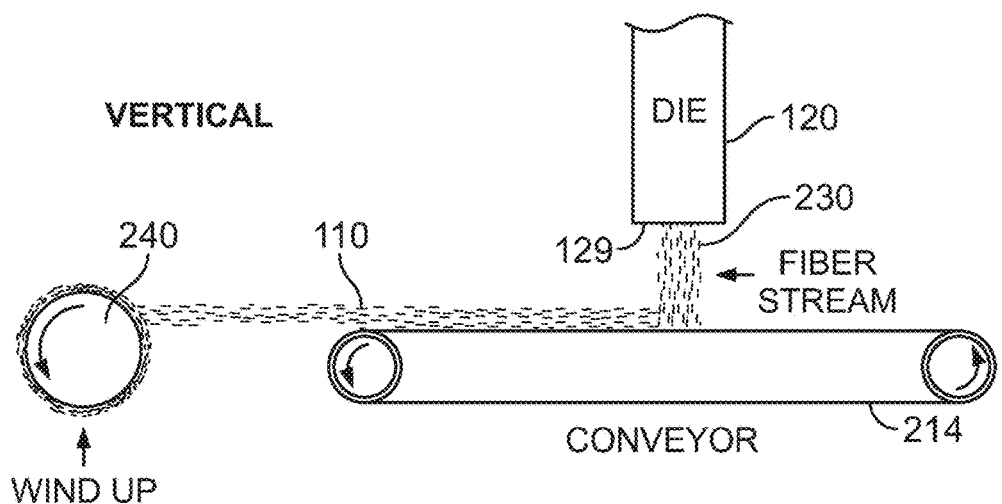
FIG. 2B is a schematic drawing of a vertical melt-blowing or spun bond process.

Both melt-blowing and spun bonding processes extrude polymeric materials and attenuate (stretch) the extruded polymer to produce fibers. Referring to FIGS. 2A and 2B, the extruded and attenuated fibers can be collected on a vacuum drum 212 or a conveyor 214. Also as shown in FIGS. 2A and 2B, these processes can be run in both a horizontal and a vertical orientation. Spun bond or melt-blown structural fibers 110 can then be collected on a wind up reel 240 for later entangling with smokeless tobacco. In other embodiments, such as those depicted in FIGS. 3, 4, 5A, 5B, 6, 7, and 13, smokeless tobacco 105 can be placed in contact with and/or entangled with the spun bond or melt-blown structural fibers 110 during the spun bond or melt-blowing processes. In some embodiments, milled tobacco is added to the polymeric material before it is melt-blown or spun bond such that the resulting melt-blown or spun bond fibers include milled tobacco at least partially encapsulated by the polymeric material of the structural fibers.

The spun bond and melt-blown processes are somewhat similar from an equipment and operator's point of view and smokeless tobacco can be added to these processes in substantially similar manners. The two major differences between a typical melt-blown process and a typical spun bond process are: i) temperature and volume of the air used to attenuate the filaments; and ii) the location where the filament draw or attenuation force is applied. A melt-blown process uses relatively large amounts of high-temperature air to attenuate the filaments. The air temperature can be equal to or slightly greater than the melt temperature of the polymer. In contrast, the spun bond process generally uses a smaller volume of air close to ambient temperature to first quench the fibers and then to attenuate the fibers. In the melt-blown process, the draw or attenuation force is applied at the die tip while the polymer is still in the molten state. Application of the force at this point can form microfibers but does not allow for polymer orientation. In the spun bond process, this force is applied at some distance from the die or spinneret, after the polymer has been cooled and solidified. Application of the force at this point provides the conditions necessary for polymer orientation, but is not conducive to forming microfibers.

Figure 2C:
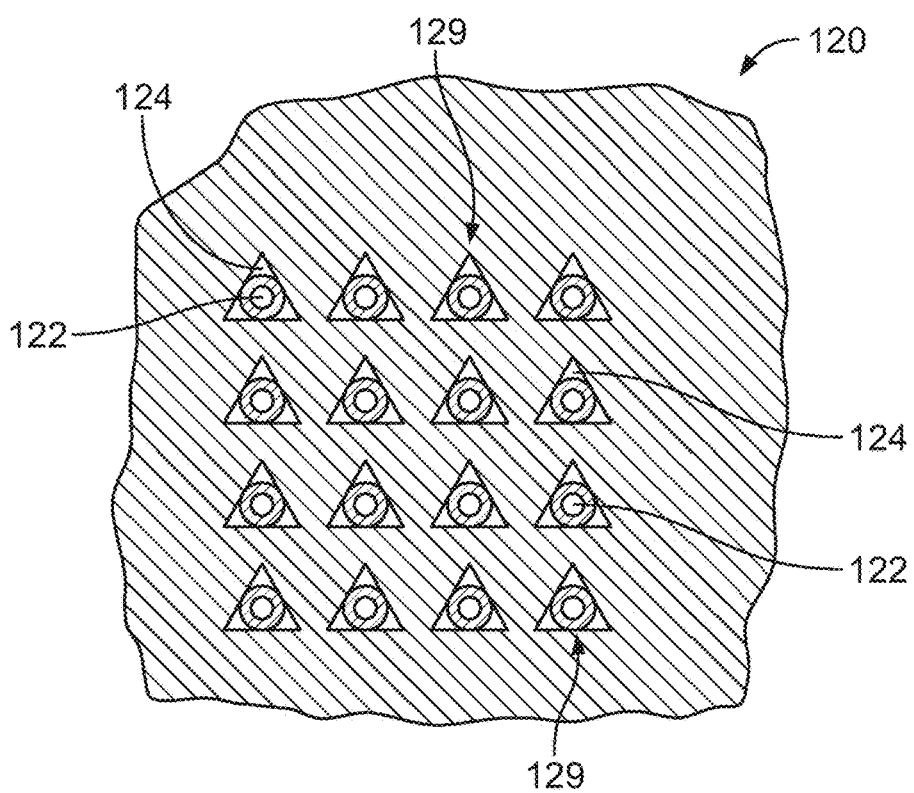
FIG. 2C depicts an example of an arrangement of melt-blowing spinnerets.
Figure 3:
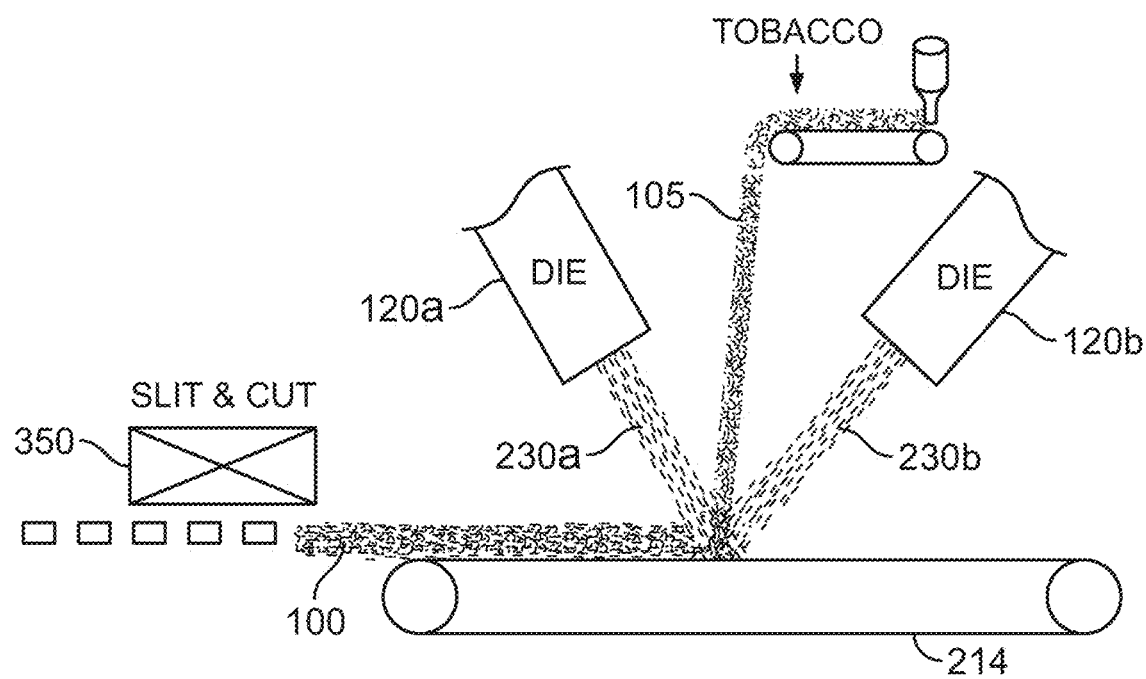
FIG. 3 is a schematic drawing of an exemplary method of making a tobacco-entangled fabric using a melt-blowing or a spun bond process.

FIG. 2C depicts an exemplary arrangement of polymer orifices and air orifices for a melt-blowing apparatus. Air orifices 124 can be adjacent to the polymer orifices 122. As shown in FIG. 2C, the air orifices 124 may surround each polymer orifice 122. Each combination of a polymer orifice 122 with surrounding air orifices 124 is called a spinneret 129. For example, the melt-blowing device 120 can have between 10 and 500 spinnerets 129 per square inch. The polymer orifices 122 and the gas velocity through gas orifices 124 can be combined to form fibers of 100 microns or less. In some embodiments, the melt-blown fibers have an average diameter of 30 microns or less. In particular embodiments, the melt-blown fibers have an average diameter of between 0.5 and 5 microns. In some embodiments, the spinnerets 129 each have a polymer orifice diameter of less than 900 microns. In some embodiments, the spinnerets 129 each have a polymer orifice diameter of at least 75 microns. The average polymer orifice diameter can range from 75 microns to 900 microns. In particular embodiments, the average polymer orifice diameter can be between 150 microns and 400 microns. In certain embodiments, polymer orifice diameters of about 180 microns, about 230 microns, about 280 microns, or about 380 microns are used.

The processes of extruding, attenuating, and depositing the polymeric fibers can result in some bonding between the different fibers. The amount of bonding can depend on a host of variables, including the temperature of the polymer and the attenuating air. Accordingly, melt-blown processes generally result in more bonding between fibers than spun bond process. Accordingly, additional bonding and/or mechanical interlocking processes can be applied to melt-blown or spun bond polymer fibers to further ensure that the tobacco-entangled fabric remains cohesive when placed in an adult tobacco consumer's mouth.

Smokeless tobacco 105 can be combined with melt-blown and/or spun bond fibers using a number of methods. In some embodiments, smokeless tobacco are introduced directly into the high velocity fiber stream 230 of either a melt-blown or spun bond process. For example, the high velocity fiber streams can also be angled towards a free falling flow of smokeless tobacco. For example, referring now to FIG. 3, loose smokeless tobacco 105 can be directed to fall into the high velocity fiber streams 230a and 230b. As the tobacco falls into the streams 230a and 230b, the tobacco's fibrous structures become entangled with the melt-blown or spun bond structural fibers. In some embodiments, the structural fibers 110 are melt-blown at a sufficiently high temperature to result in sufficient bonding between the structural fibers such that the tobacco-entangled fabric 100 becomes cohesive and dimensionally stable. In other embodiments, not shown, the mixture of melt-blown or spun bond structural fibers and smokeless tobacco can be heated on the conveyor (e.g., by IR lamp) to bond the structural fibers. A cutting apparatus 350 can be used to cut the tobacco-entangled fabric 100 to desired dimensions. In some embodiments, extruders 120a and 120b each deliver different structural fibers 110, both in terms of materials, dimensions, or even processes. For example, in some embodiments, a tobacco-entangled fabric can include both melt-blown and spun-bond fibers. In some embodiments, a tobacco-entangled fabric includes a combination of mouth-stable structural fibers and mouth-dissolvable fibers using a melt-blowing or spun bonding process.

Mouth-stable structural fibers can include the full array of extrudable polymers, such as polypropylene, polyethylene, PVC, viscose, polyester, and PLA. In some embodiments, the mouth-stable structural fibers have low extractables, have FDA food contact approval, and/or be manufactured by supplies who are GMP approved. Highly desirable are materials that are easy to process and relatively easy to approve for oral use (e.g. quality, low extractables, has FDA food contact approval, suppliers are GMP approved). Mouth-stable structural fibers can also include natural fibers, such as cotton or viscose (solvent cast).

Mouth-dissolvable fibers could be made from hydroxypropyl cellulose (HPC), methyl hydroxypropyl cellulose (HPMC), polyvinyl alcohol (PVOH), PVP, polyethylene oxide (PEO), starch and others. These fibers could contain flavors, sweeteners, milled tobacco and other functional ingredients. The fibers could be formed by extrusion or by solvent processes.

Figure 4:
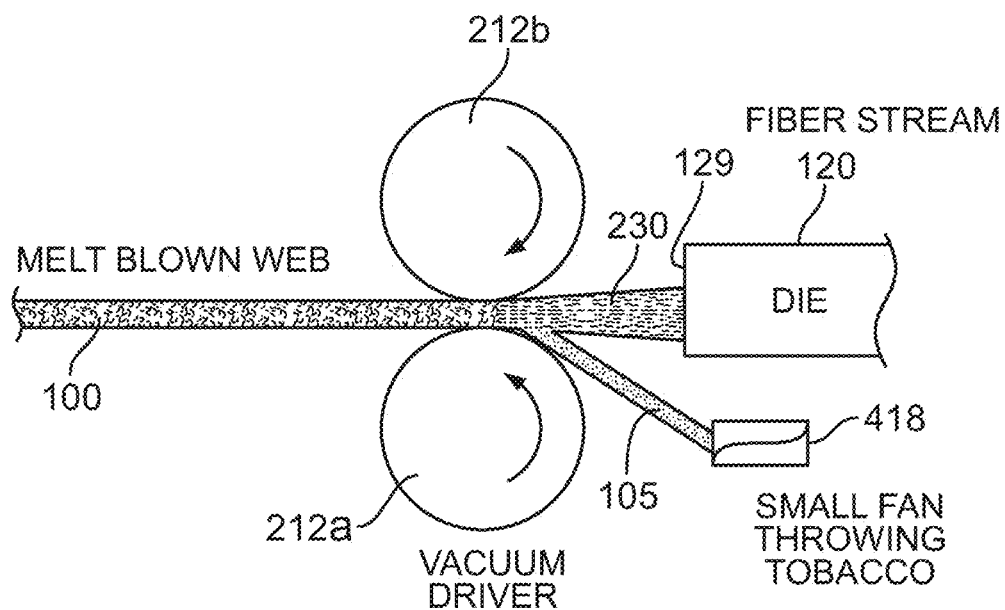
FIG. 4 is a schematic drawing of another exemplary method of making a tobacco-entangled fabric using a melt-blowing or a spun bond process.

Referring now to FIG. 4, smokeless tobacco material 105 can be blown by a blower 418 into a stream 230 of melt-blown or spun bond structural fibers 110 exiting a die in a horizontal process. The stream of smokeless tobacco 105 entangled with the structural fiber 110 can be collected and calendared between a pair of vacuum drums 212a and 212b. Calendaring can be used in combination with heat (either added or latent) to bond the structural fibers. In other embodiments, additional methods of bonding or entangling the structural fibers 110 can be used on the tobacco-entangled fabric 100.

Figure 5A:
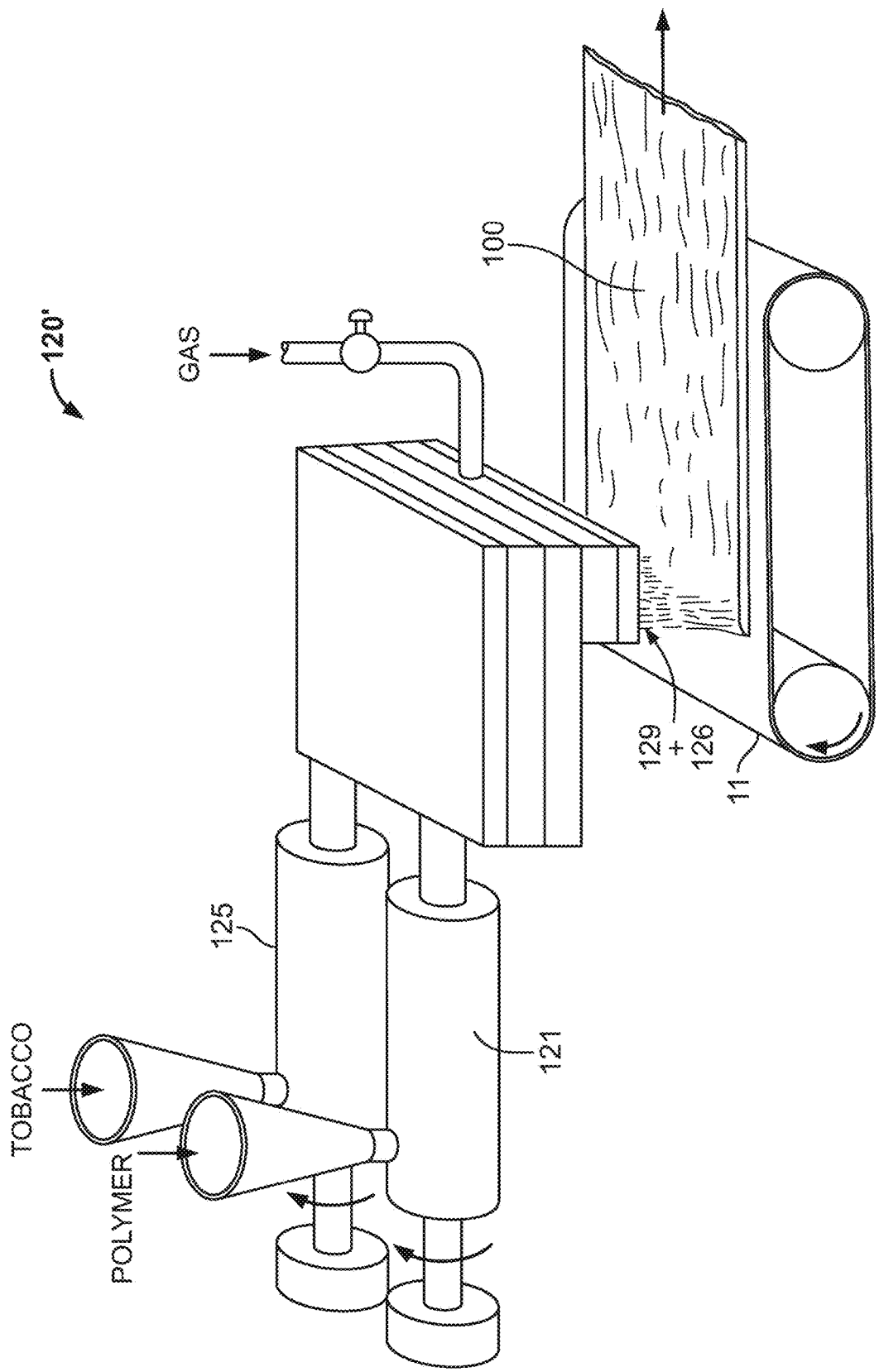
FIG. 5A is a schematic drawing of yet another exemplary method of making a tobacco-entangled fabric using a melt-blowing or spun bond process.
Figure 5B:
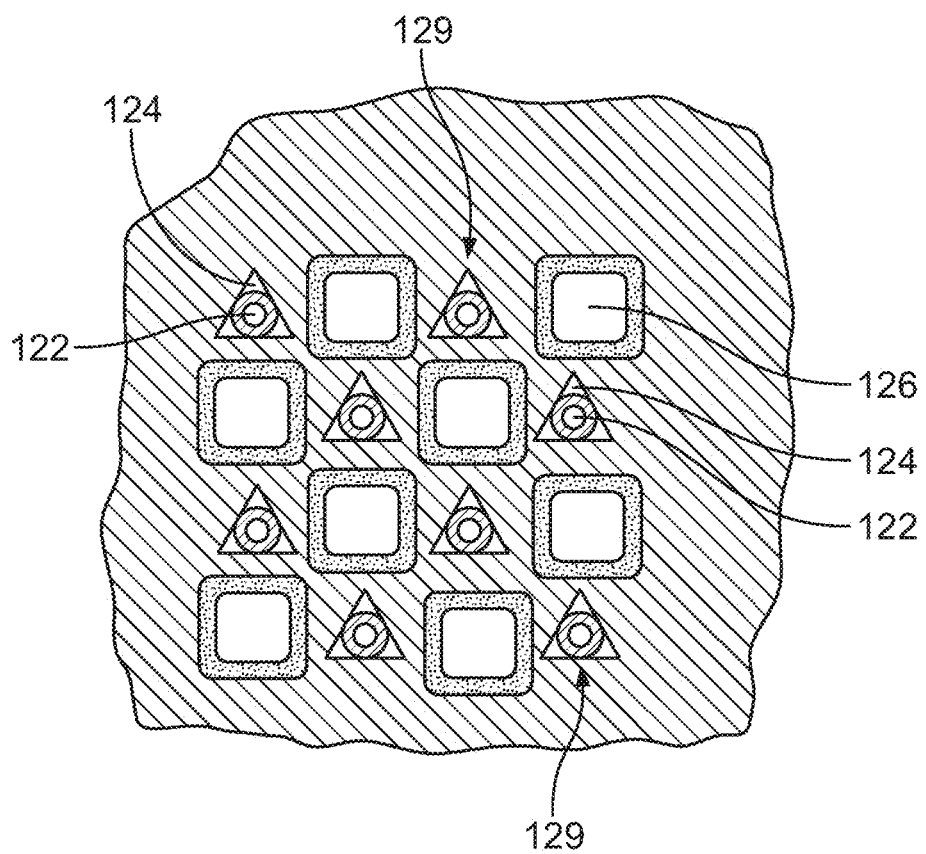
FIG. 5B depicts an exemplary arrangement of polymer orifices, air orifices, and tobacco dispensing orifices for a melt-blowing or spun bond device that can dispense tobacco material concurrently with melt-blowing or spun bonding structural fibers.

Referring now to FIGS. 5A and 5B, tobacco can also be deposited between adjacent spinnerets 129 by the same apparatus producing the structural fibers. As shown, a melt-blowing device 120' can be configured to deliver smokeless tobacco 105 during a melt-blowing process. In addition to including a polymer extruder 121, the melt-blowing device 120' also includes a tobacco conveyor 125 that delivers smokeless tobacco 105 to be mixed with the melt-blown polymeric structural fibers 110 as the polymeric material exits the polymer orifices 122. As shown in FIG. 5B, tobacco delivering orifices 126 may be placed adjacent polymer orifices 122 and air orifices 124. FIG. 5B, like the other figures, is not to scale. In practice the smokeless tobacco delivering orifices 126 may be one to several orders of magnitude larger than the polymer orifices 122. In other embodiments, tobacco delivering orifices 126 may be in rows between one or more rows of spinnerets 129. The precise dimensions and arrangement of the smokeless tobacco delivering orifices 126 will depend on the properties of the particular smokeless tobacco and the selected method of delivery. In some embodiments, the smokeless tobacco 105 may be conveyed through the melt-blowing device 120' pneumatically in order to prevent clogging. In other embodiments, vibrating conveyors may be used. The combination of the smokeless tobacco 105 and the polymeric structural fibers 110 can be deposited onto a conveyor belt 11 to form a homogeneous tobacco-entangled fabric 100. The speed of the conveyor belt 11 can be controlled to build a desired thickness (for example of between 0.1 and 1.0 inches). The homogeneous tobacco-entangled fabric 100 may then be die cut.

Figure 6:
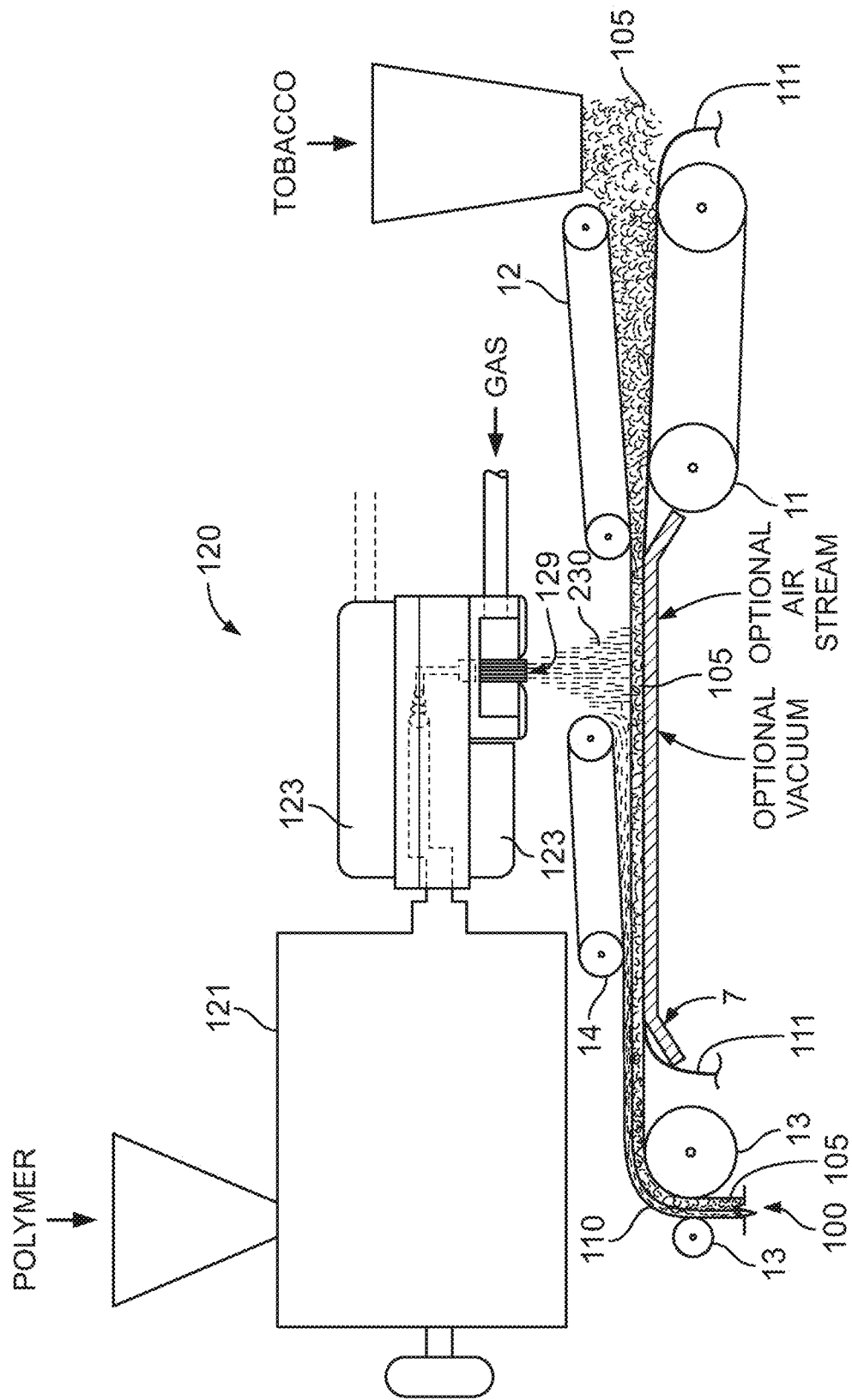
FIG. 6 is a schematic drawing of an exemplary method of melt-blowing or spun bonding a layer of structural fibers onto a layer of smokeless tobacco.
Figure 7:
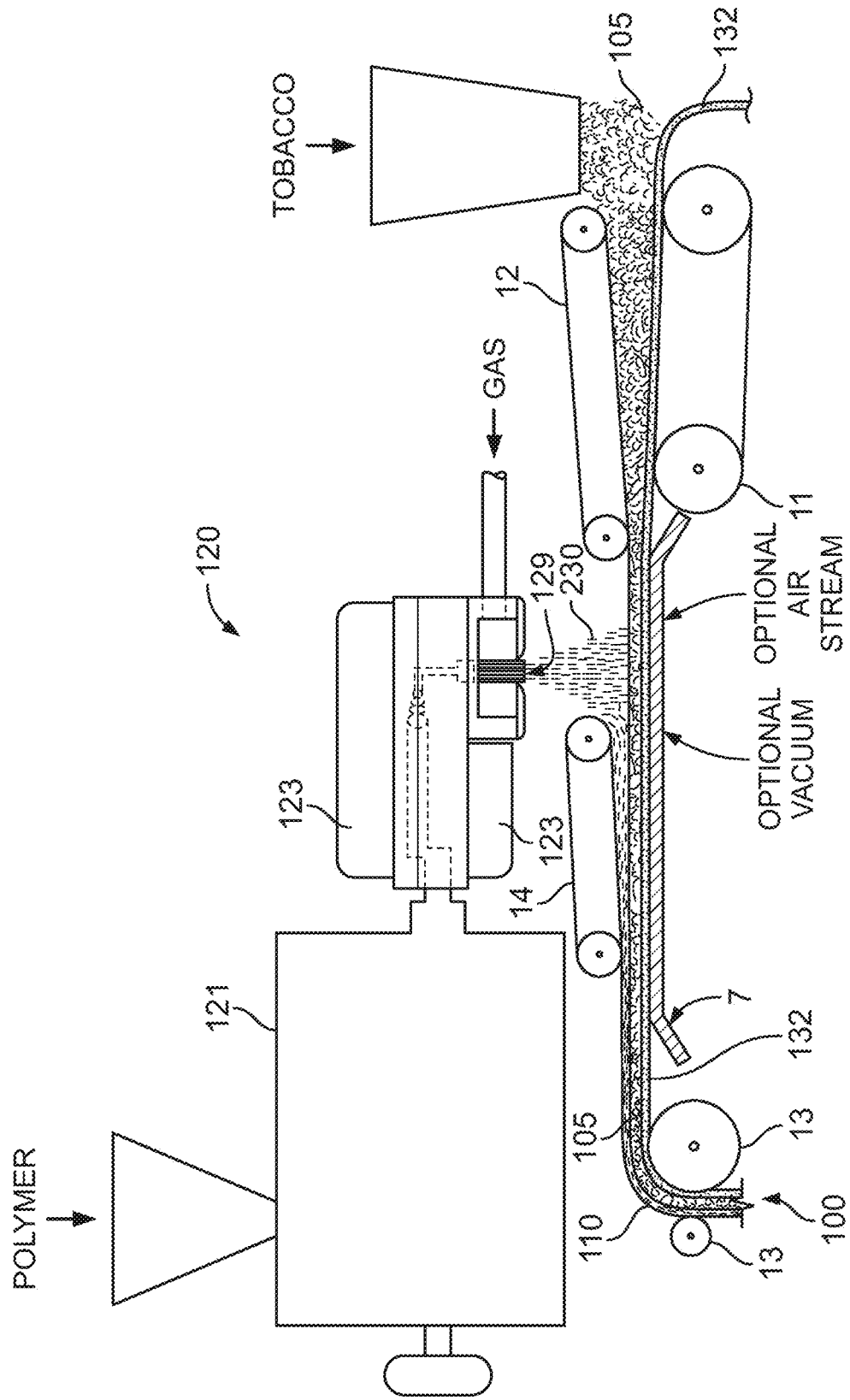
FIG. 7 is a schematic drawing of another exemplary method of melt-blowing or spun bonding a layer of structural fibers onto a layer of smokeless tobacco.

Smokeless tobacco can also be deposited onto a vacuum drum or conveyor and covering with fibers from the fiber stream to contact the smokeless tobacco with structural fibers. In some embodiments, covering the smokeless tobacco with melt-blown or spun bond fibers results in at least some entangling of the tobacco's fibrous structures and the melt-blown or spun bond fibers. Referring now to FIGS. 6 and 7, smokeless tobacco 105 (e.g., smokeless tobacco material) may be deposited onto a carrier 111 or web 132 and transported past a melt-blowing device 120 to deposit melt-blown polymeric fibers 110 onto the smokeless tobacco material 105. In particular embodiments, the smokeless tobacco 105 is compacted (e.g., subjected to a mechanical compacting process) prior to passing under spinnerets 129. The carrier 11 or 132 is supported by a platform 7 during the melt-blowing and/or spun bond processes. In some embodiments, the platform produces a vacuum in the area underneath the position of the spinnerets 129. The vacuum can pull the melt-blown polymeric fibers towards the platform 7 and may assist in fiber bonding. Porous layers (porous carrier 11, porous web 132, porous layers of tobacco material 105, etc.) can permit the vacuum to pull the melt-blown polymeric fibers towards platform 7. In certain embodiments, an air stream for disrupting tobacco material can be positioned immediately prior to the vacuum section of platform 7, which can result in intermingling of the tobacco's fibrous structures with the structural fibers.

FIGS. 6 and 7 depict conveyors 12 that compact the deposited smokeless tobacco 105. The smokeless tobacco 105 can be pre-compressed to a desired thickness and density prior to melt-blowing the polymeric fiber 110. For example, the thickness of a compacted layer of smokeless tobacco prior to application of the melt-blown polymeric fiber can be between 1 mm and 5 mm, of between 3 mm and 10 mm, of between 0.5 cm and 2 cm, of between 1 cm and 3 cm. A polymeric fiber layer deposited over the compacted layer of smokeless tobacco can have a thickness of between 10 microns and 100 microns, of between 50 microns and 500 microns, of between 100 microns and 1000 microns, of between 0.5 mm and 5 mm, or of between 1 mm and 10 mm. For example, multiple layers of smokeless tobacco and multiple layers of melt-blown or spun bond structural fibers can be deposited in an alternating fashion.

In other embodiments, not depicted, the smokeless tobacco 105 is deposited in a loose form and not compacted prior to depositing the polymeric fibers 110. For example, a non-compacted layer of smokeless tobacco can be deposited on a conveyor and have a thickness of between, for example, 0.1 inches and 3.0 inches. In some embodiments, multiple layers of non-compacted smokeless tobacco of between 0.1 and 1.0 inches thickness are successively deposited along with alternating layers of polymeric fiber, each layer of melt-blown polymeric fiber having a thickness of between 10 and 100 microns, of between 50 microns and 500 microns, of between 100 microns and 1000 microns, of between 0.5 mm and 5 mm, or of between 1 mm and 10 mm. In some embodiments, the layers of polymeric fiber alternate between melt-blown fibers and spun bond fibers. The tobacco-entangled fabric 100 can be cut width-wise, length-wise, and thickness-wise to form a piece of tobacco-entangled fabric 100 having the desired dimensions. For example, a piece of tobacco-entangled fabric having a dimensions of 1 inch×1 inch×0.1 inch may be made by (a) forming a 0.1 inch thick tobacco-entangled fabric and cutting out a one inch square; or (b) by forming a 1 inch thick tobacco-entangled fabric and slicing off pieces every 0.1 inch. The cut surfaces can have a different surface texture than non-cut surfaces.

In some circumstances, as shown in FIG. 6, a carrier 111 may include a backing layer that does not contribute fibers to the final tobacco-entangled fabric 100 and can be readily peeled away or removed after the melt-blowing or spun bond process is completed. In some embodiments, the smokeless tobacco/melt-blown or spun bond polymeric fiber composite is further processed to further secure the smokeless tobacco to the melt-blown polymeric fiber. For example, the smokeless tobacco/melt-blown polymeric fiber composite may be needled, needle punched, needle felted, air-jet entangled, spun laced, or hydroentangled.

Multiple layers of tobacco material 105 and polymeric fiber 110 can be built up to a desired thickness. For example, the melt-blown tobacco-entangled fabric can have a thickness of between 0.1 and 1.0 inches. Accordingly, in some embodiments, multiple melt-blowing or spun bonding devices 120 and/or smokeless tobacco dispensers are alternated in series over a conveyor system to deposit alternating layers of melt-blown polymeric fibers and smokeless tobacco. By controlling the speed of the conveyor system and the rates of depositing melt-blown or spun bond polymeric fiber and smokeless tobacco, the thickness of each layer can be controlled to have thicknesses in the ranges discussed above. In some embodiments, the thickness of each layer is sufficiently thin such that each melt-blown polymeric fiber layer contacts adjacent structural fiber layers and results in the tobacco's fibrous structures being entangled within a nonwoven network of structural fibers. The polymeric fibers of each layer can then be bonded to form a solid tobacco-entangled fabric 100 having bonding between adjacent structural fiber layers. In other embodiments, the concentration of smokeless tobacco can vary between different layers of melt-blown polymer. For example, interior layers may have a lower concentration of smokeless tobacco. In certain embodiments, a layer or deposit of smokeless tobacco can be disrupted during or immediately prior to passing under a stream 230 of polymeric structural fibers to distribute the tobacco material throughout the polymeric structural fibers. For example, air jets can be positioned underneath the carrier 11 or web 132 to project at least some of the smokeless tobacco into a "waterfall" of the polymeric fiber leaving the spinnerets 129.

Melt-blowing Fiber Properties Melt-blown webs usually have a wide range of product characteristics. Melt-blown webs can have a random fiber orientation; a low to moderate web strength, deriving strength from mechanical entanglement and frictional forces; a fiber diameter ranges from 0.1 to 100 microns; a basis weight ranges from 1-350 $g/m^2$; and have a smooth surface texture and a circular cross-section. In some embodiments, the melt-blown fibers can have a diameter range of between 0.5 and 5 microns. The fiber lengths in a melt-blown web can be variable; it can be produced in the range from a few millimeters to several hundred centimeters in length and usually exists over a broad range. The fiber cross-section is also variable, ranging from circular to a flat configuration and other variations.

Composite formation can be used to provide enhancement of other properties. For example, an SMS structures based on a three-ply system of Spun bond/Melt-blown/Spun bond plies can be used in combination with smokeless tobacco to provide an enhanced composite tobacco-entangled fabric. Melt-blowing processes can also be used to produce composite fibers, which include multiple materials. Electro spun and force spun fibers, as discussed below, can also be added for texture.

Spun Bond Fiber Properties

The spinning process is similar to the production of continuous filament yarns and utilizes similar extruder conditions for a given polymer. Accordingly, spun bond fibers have at least a partial orientation. A partial orientation can increase strength and decrease extensibility. Spun bonded webs offer a wide range of product characteristics ranging from very light and flexible structure to heavy and stiff structure. The properties include: random fibrous structure; most spun bond webs are layered or shingled structure, the number of layers increases with increasing basis weight; basis weights range between 5 and 800 $g/m^2$, typically 10-200 $g/m^2$; fiber diameters range between 1 and 50 µm; web thicknesses range between 0.1 and 4.0 mm, typically 0.2-1.5 mm; high strength-to-weight ratios compared to other nonwoven, woven, and knitted structures; high tear strength (for area bonded webs only); planar isotropic properties due to random lay-down of the fibers; good fray and crease resistance; high liquid retention capacity due to high void content; high in-plane shear resistance, and low drapeability.

Electro Spinning Systems

Electro spinning is a process that spins fibers of diameters ranging from 10 nm to several hundred nanometers; typically polymers are dissolved in water or organic solvents. The process makes use of electrostatic and mechanical force to spin fibers from the tip of a fine orifice or spinneret. The spinneret is maintained at positive or negative charge by a DC power supply. When the electrostatic repelling force overcomes the surface tension force of the polymer solution, the liquid spills out of the spinneret and forms an extremely fine continuous filament. These filaments are collected onto a rotating or stationary collector with an electrode beneath of the opposite charge to that of the spinneret where they accumulate and bond together to form nanofiber fabric. Electro spun nanofibers, in some embodiments, can be adapted to dissolve in the mouth. For example, fibers can be spun from water (or other solvent) solutions of soluble polymers such as HPC, HPMC, or PVOH; these fibers could contain flavors, sweeteners, milled tobacco or other functional ingredients. For example, the bulk of the tobacco-entangled fabric can be made of one or multiple melt-blown layers designed from coarse to fine filaments and combined with electro spun nanofiber web. Melt-blown and/or spun bond layers can provide stability while an outer electro spun nanofiber layer can improve smoothness. In some embodiments, electro spun fibers are layered with natural structural fibers (e.g., cotton fibers) and/or polymeric structural fibers to provide a textural sensation. In some embodiments, electro spun fibers are chopped and mixed with polymeric structural fibers (e.g., melt-blown or spun bond fibers) and thermally bonded within the network of structural fibers to provide a unique textural sensation.

Force Spinning Systems

Force spinning is a process that spins fibers of diameters ranging from 10 nm to 500 nm using a rotary drum and a nozzle, much like a cotton candy machine. The process makes use of a combination of hydrostatic and centrifugal pressure to spin fibers from the nozzle. For example, one type of force spinning is rotary jet spinning, where a polymeric material is retained inside a reservoir atop a controllable motor and extruded out of a rapidly rotating nozzle. Force spun nanofibers, in some embodiments, can be adapted to dissolve in the mouth. For example, fibers can be force spun from water (or other solvent) solutions of soluble polymers such as HPC, HPMC, or PVOH; these fibers could contain flavors, sweeteners, milled tobacco or other functional ingredients. The bulk of the tobacco-entangled fabric can be made of one or multiple melt-blown layers designed from coarse to fine filaments and combined with force spun nanofiber web. Melt-blown and/or spun bond layers can provide stability while an outer force spun nanofiber layer can improve smoothness. In some embodiments, force spun fibers are layered with natural structural fibers (e.g., cotton fibers) and/or polymeric structural fibers to provide a textural sensation. In some embodiments, force spun fibers are chopped and mixed with polymeric structural fibers (e.g., melt-blown or spun bond fibers) and thermally bonded within the network of structural fibers to provide a unique textural sensation.

Stabilizing-Mechanical Entanglement and/or Bonding

After the smokeless tobacco and structural fibers are arranged, either in layers or intermingled, the web may need further mechanical, thermal, or chemical treatment in order to have the structural fibers form a network in which fibrous structures of the tobacco material are entangled. In other embodiments, a tobacco-entangled fabric may be further processed (e.g., entangled or bonded) to produce a more cohesive and/or dimensionally stable tobacco-entangled fabric. For example, mixing smokeless tobacco in with cotton fibers in a carding process may result in an intermingled web of structural fibers and smokeless tobacco, but the carding process may not sufficiently entangle the fibers such that the web is cohesive. Likewise, a spun bond process depositing polymeric fibers on a layer of smokeless tobacco does bring the polymeric structural fibers in contact with smokeless tobacco, but may not result in an intermingling of the polymeric structural fibers with the smokeless tobacco. Moreover, tobacco material and a web of structural fibers can be combined and entangled by needling, needle punching, needle felting, air-jet entangling, spun lacing, and/or hydroentanglement processes. Accordingly, a web including smokeless tobacco can be subject to needling, needle punching, needle felting, air-jet entangling, spun lacing, hydroentanglement, stitch bonding, thermal bonding, ultrasonic bonding, radiation bonding, chemical bonding, combinations thereof, or other treatment steps to make the tobacco-entangled fabric cohesive and/or dimensionally stable.

Needling Processes

Some embodiments of the tobacco-entangled fabric 100 can include smokeless tobacco 105 that is needled with the structural fibers 110 so that the smokeless tobacco is entangled, and thereby secured, within the structural fibers of a tobacco-entangled fabric 100. The structural fibers can be provided by one of the methods discussed above (with or without the inclusion of smokeless tobacco intermingled in the structural fibers). In certain embodiments, one or both exterior surfaces of a needled tobacco-entangled fabric can be predominantly smokeless tobacco (including fibrous structures) or predominantly structural fibers.

Figure 8:
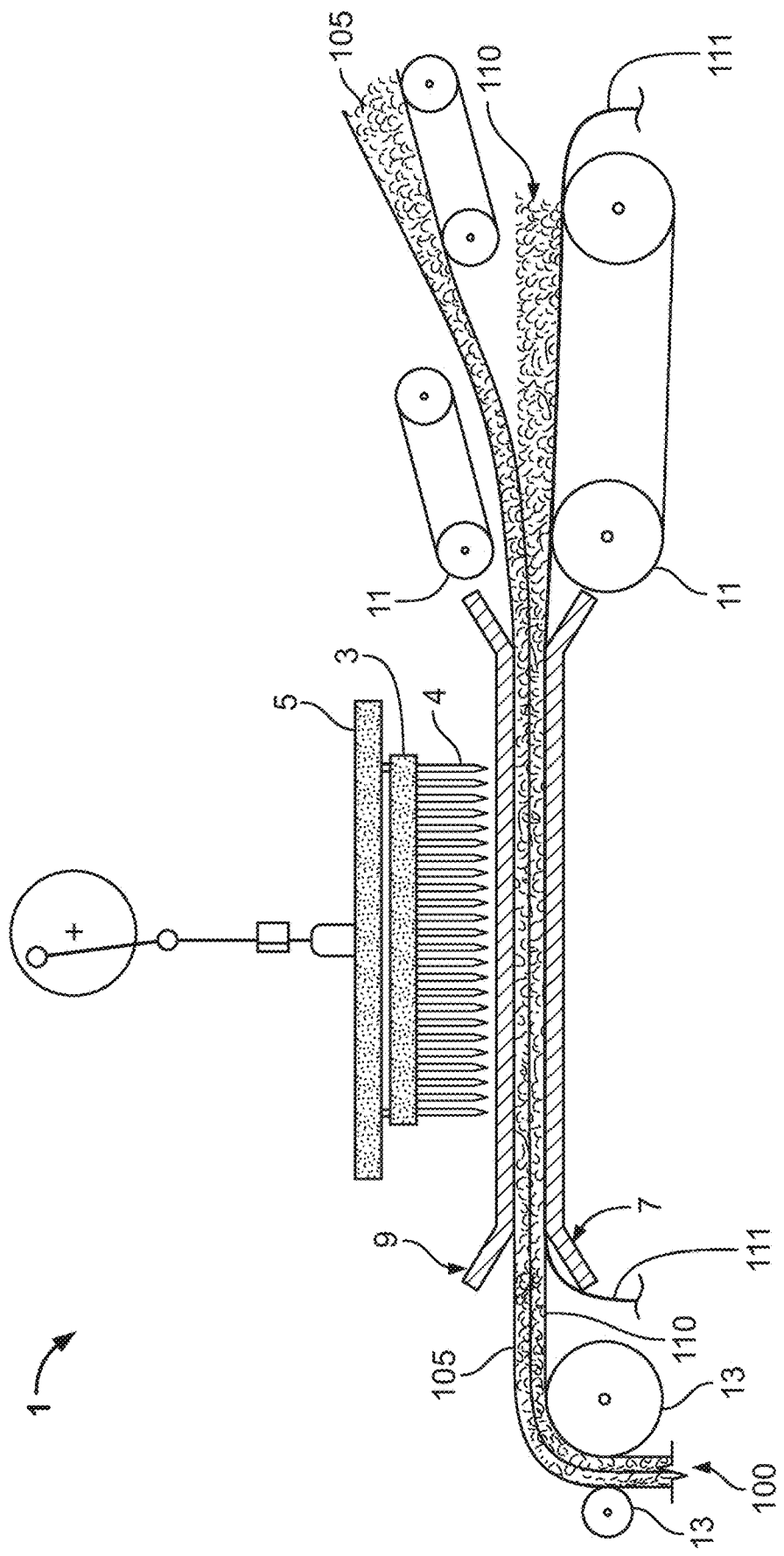
FIG. 8 is a schematic of an exemplary method of making a tobacco-entangled fabric using a needle loom to intermingle smokeless tobacco with structural fibers.
Figure 9:
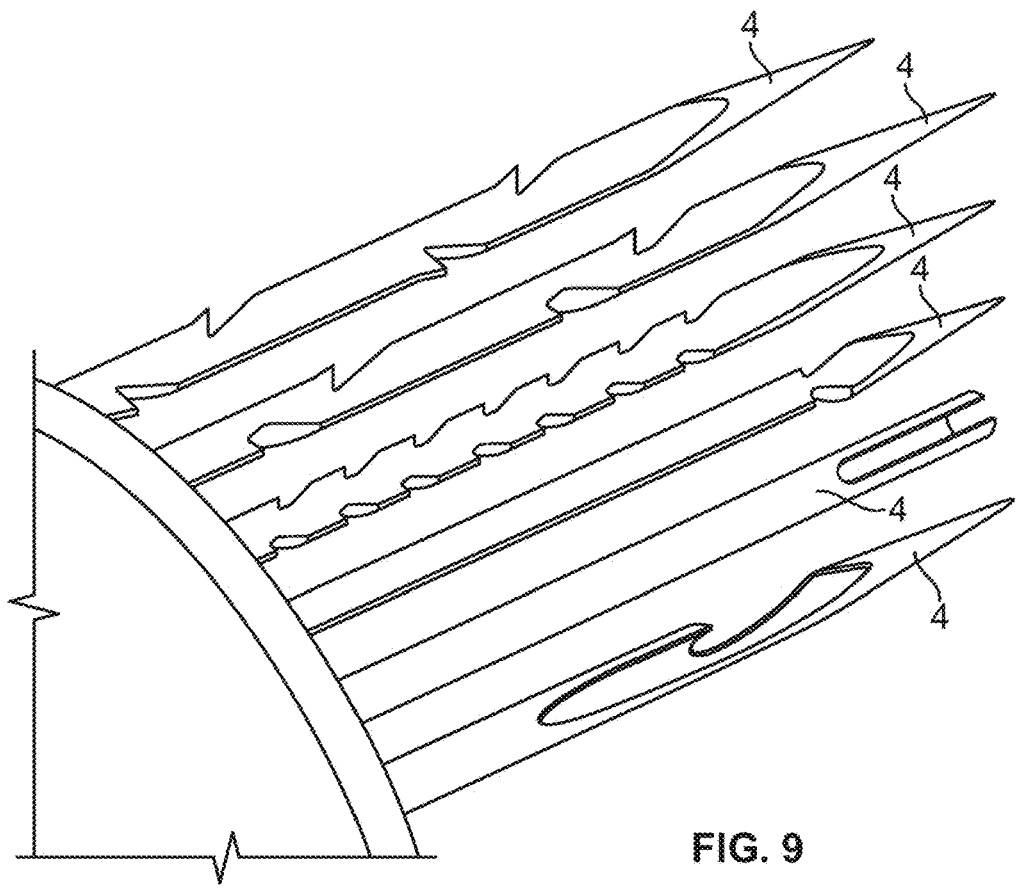
FIG. 9 is a schematic showing various needles that can be used in a needle loom.
Figure 10:
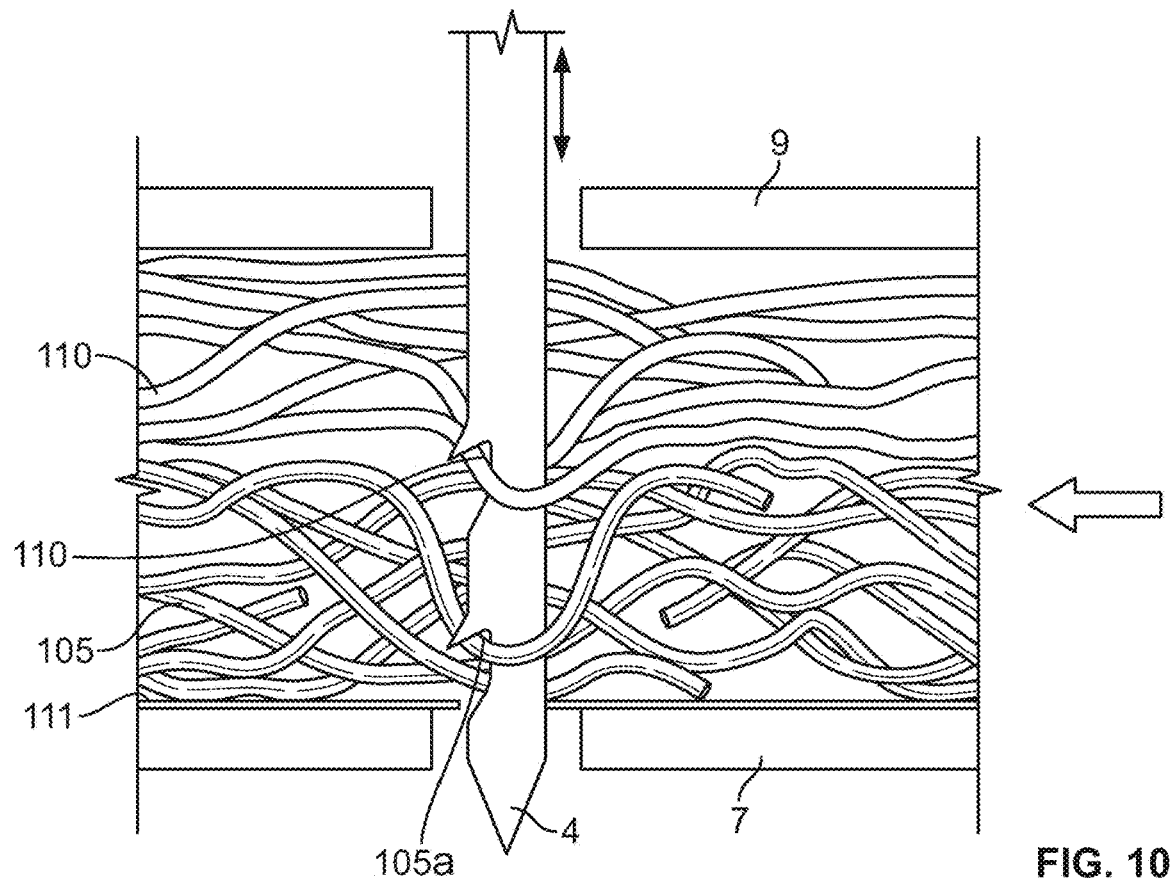
FIG. 10 is a schematic showing an enlarged view of the needling effect on fibers.

Needling, also known as needle punching, is a process by which a fabric is mechanically formed by penetrating a web of fibers with an array of barbed needles that carry tufts of the fibers in a vertical direction. Needle felting is a similar process. Referring now to FIGS. 8-10, the smokeless tobacco 105 (e.g., moist cured, fermented smokeless tobacco) can be advantageously needled together with structural fibers 110 so that the smokeless tobacco is entangled and secured in the structural fibers. In particular embodiments, the smokeless tobacco 105 is not compacted (e.g., it is not subjected to a mechanical compacting process) or chemically treated (e.g., by the use of a binding agent) during the needling process. As such, the smokeless tobacco 105 can surprisingly and advantageously retain a desired range of moisture, flavor and tactile characteristics after the needling process is complete and the nonwoven needled articles 100 are ready for packaging. Moreover, the needling process used to secure the smokeless tobacco 105 to the structural fibers 110 may be unlike conventional needling of traditional nonwoven textiles. In particular, it will be understood from the description herein that the smokeless tobacco 105 can be surprisingly and advantageously entangled within a web of structural fibers by needling without compromising the moisture, flavor and tactile characteristics of the smokeless tobacco. Furthermore, when smokeless tobacco is used, the nonwoven needled article 100 provides the adult tobacco consumer with a tobacco product that offers advantages compared to a "pinch" or dip of loose tobacco in terms of handling, placement in the mouth, stability in the mouth, and removal from the mouth.

As shown in FIG. 8, a typical needle loom 1 contains a needle board 3, which is the base unit into which the needles 4 are inserted and held. The needle board 3 then fits into the needle beam 5, which holds the needle board 3 in place. A needle loom also includes a bed plate 7, which is positioned underneath the layers of structural fiber and smokeless tobacco, and a stripper plate 9, which is positioned above the layers of structural fiber and smokeless tobacco. In some circumstances, the web passing through the needle loom 1 may include a backing layer 111. A backing layer can be fibrous or non-fibrous. A fibrous backing layer contributes structural fibers to the final needled tobacco article 100, while a non-fibrous backing layer does not contribute structural fibers to the final needled tobacco-entangled fabric 100 and can be peeled away or removed after the needling process is completed. For example, the smokeless tobacco 105, which may, for example, comprise smokeless tobacco in shredded or cut form, can be deposited on the backing layer 111 followed by a layer of structural fibers and advanced along a feed conveyor 11 and into the space between the bed plate 7 and the stripper plate 9. Each of the bed plate 7 and the stripper plate 9 includes a set of holes corresponding to the needles 4 so that the needles 4 are aligned to pass in and out of the holes in the plates 7 and 9. During the return of the needles 4 to an upward position, the stripper plate 9 strips the fibers from the needles 4 so that the layers of structural fiber and smokeless tobacco can advance through the needle loom 1. Advancement through the needle loom 1 can be facilitated by a feed roll 11 and an exit roll 13.

FIG. 9 shows representative needles 4 that can be employed in the needle loom 1 to penetrate the layers of structural fibers and smokeless tobacco 105 for use in the aforementioned needle punching process to manufacture the needled tobacco articles 100. Simply by way of example, needles 4 can have different shapes (e.g., pinch blades, star blades, and conical blades) and different barb configurations (e.g., placement, angle, and shape). In certain embodiments, the needle loom 1 contains needles 4 that are all the same shape and configuration; in certain embodiments, the needle loom 1 contains needles 4 having more than one shape and/or configuration. It would be understood that the particular shape and configuration of the needles 4 used in the needle punching process, as well as the number of penetrations per square inch (ppsi) and the penetration depth of the needles 4, would be dependent upon the characteristics of the particular structural fibers used, the characteristics of the smokeless tobacco used, the number of layers of each, and the desired properties of the finished needled tobacco article 100.

As shown in FIG. 10, the needle loom beam 5 is configured to reciprocate up and down so that the needles 4 penetrate in and out of the corresponding holes of the plates 7 and 9. In doing so, the needles penetrate the structural fibers 110 and the smokeless tobacco 105 while barbs on the blade of each needle 4 can pick up fibers (e.g., primarily structural fibers and only incidentally tobacco's fibrous structures 105a) on the downward movement and carry these fibers the depth of the penetration. The reciprocation of the needles 4 occurs repeatedly while the feed rolls 11 and exit rolls 13 force the layers of smokeless tobacco and structural fiber layers through the needle loom 1 as the needles reorient the fibers from a predominantly horizontal orientation to a generally vertical orientation.

Thus, in the aforementioned embodiment, the needled tobacco-entangled fabric can be formed using a needling process that includes needling structural fibers with smokeless tobacco. One of the structural fibers 110 that can be used in the needle loom 1 with the smokeless tobacco 105 can be cotton fiber. It should be understood from the description herein, however, that the structural fibers are not necessarily limited to cotton. For example, structural fibers can include other types of natural fibers (e.g., wool, flax, jute, bamboo)

as well as acrylics, nylon, polyester, polyethylene, polypropylene, polyvinyl chloride, polylactic acid, polyvinyl alcohol, and rayon, viscose or other modified cellulosic fibers (e.g., reconstituted cellulosic fibers as discussed below). A variety of methods and combinations of methods are suitable for providing the structural fibers use in a needling process to create the tobacco-entangled fabric. For example, the webs/substrates/fiber source for fibers can be obtained from dry laid, air laid, wet laid, spun laced, melt blown, electro spun, and/or force spun; fibers supplied by any of these processes may be further processed into fabrics with needle punching or other web forming processes prior to their use in forming tobacco-entangled fabrics. In some embodiments, the structural fibers are dry laid natural fibers. In other embodiments, the fibers are melt-blown or spun bond polymeric fibers. In addition, structural fibers used in the needling process to produce a needled tobacco article can be provided from woven or nonwoven fabrics provided that the fabric provides a sufficient number of 'loose' structural fibers that are available to participate in the needling process and secure the smokeless tobacco in the finished article. The needling process, however, can turn a loosely woven fabric of structural fibers into a nonwoven network of structural fibers due to a reduction in the order of the structural fibers. In addition, using a lower denier (e.g., a lower linear mass density) may provide a softer tobacco-entangled fabric having a pleasant mouth feel.

Figure 11:
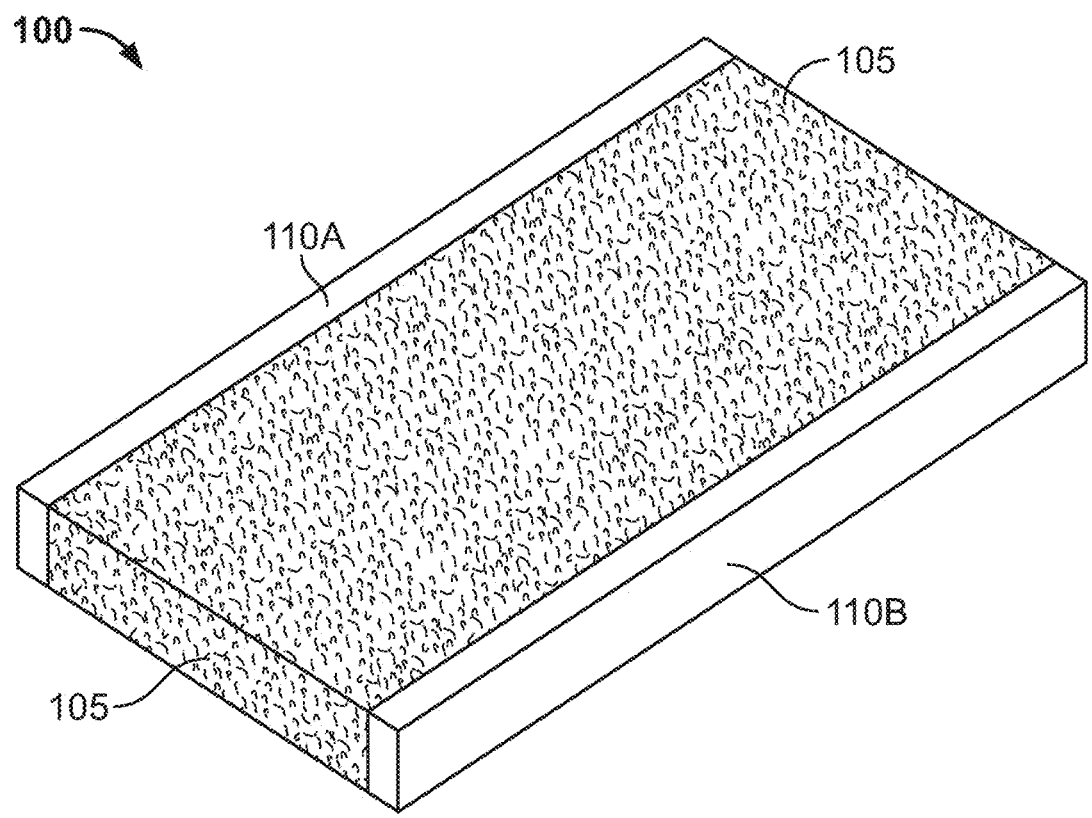
FIG. 11 is an image of a representative embodiment of a needled tobacco-entangled fabric.

Referring now to FIG. 11, some embodiment of a tobacco-entangled fabric pieces can have a shape or a layer structure that is different from the particular embodiment of the article 100 depicted in FIG. 1. For example, in one alternative embodiment of a needled tobacco-entangled fabric piece 100' for use in the mouth, the smokeless tobacco 105 is needled between two layers 110a and 110b of staple fibers. Similar to previously described embodiments, the needled tobacco-entangled fabric piece 100' in this embodiment includes a predetermined portion of smokeless tobacco 105, and the smokeless tobacco 105 can be exposed along a number of exterior surfaces of the tobacco-entangled fabric piece 100'. Further, the needled tobacco-entangled fabric pieces 100' can be packaged in a container 52 with a lid 54 (FIG. 1) along with a plurality of similarly shaped articles 100' so that an adult tobacco consumer can conveniently select any of the tobacco-entangled fabric pieces 100' therein for use in the mouth and receive a substantially identical portion of the smokeless tobacco 105. Although such tobacco-entangled fabric pieces 100' for use in the mouth can be made in numerous ways, the tobacco-entangled fabric shown in FIG. 11 can be manufactured using the methods described in, for example, Example 25 or 26, and cut into tobacco-entangled fabric pieces. The tobacco-entangled fabric piece depicted in FIG. 11 is approximately 0.5 inch by 1.0 inch and has a thickness of about 0.25 inches.

Figure 12A:
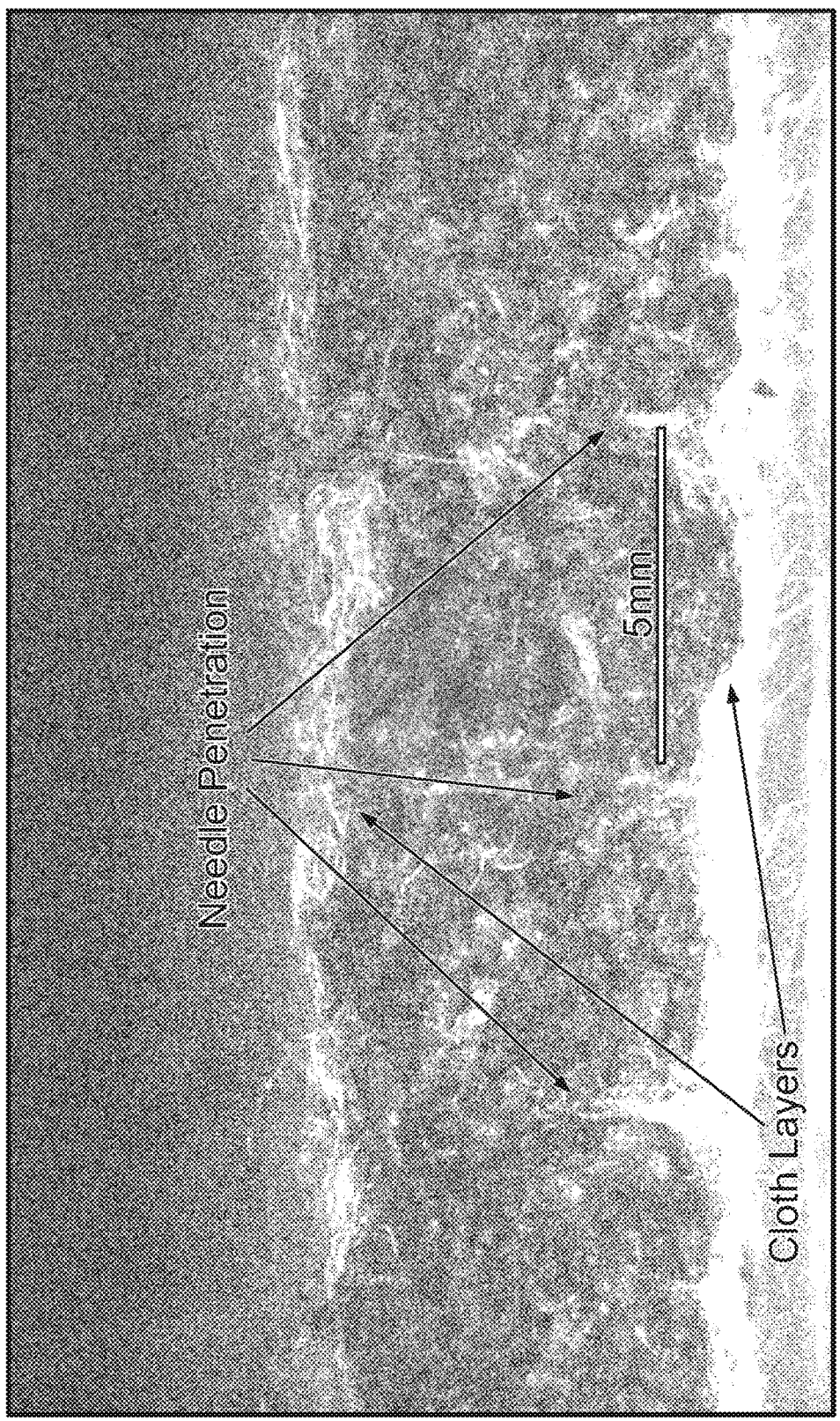
FIGS. 12A-C are micrographs showing representative tobacco-entangled fabrics formed by needling processes.
Figure 12B:
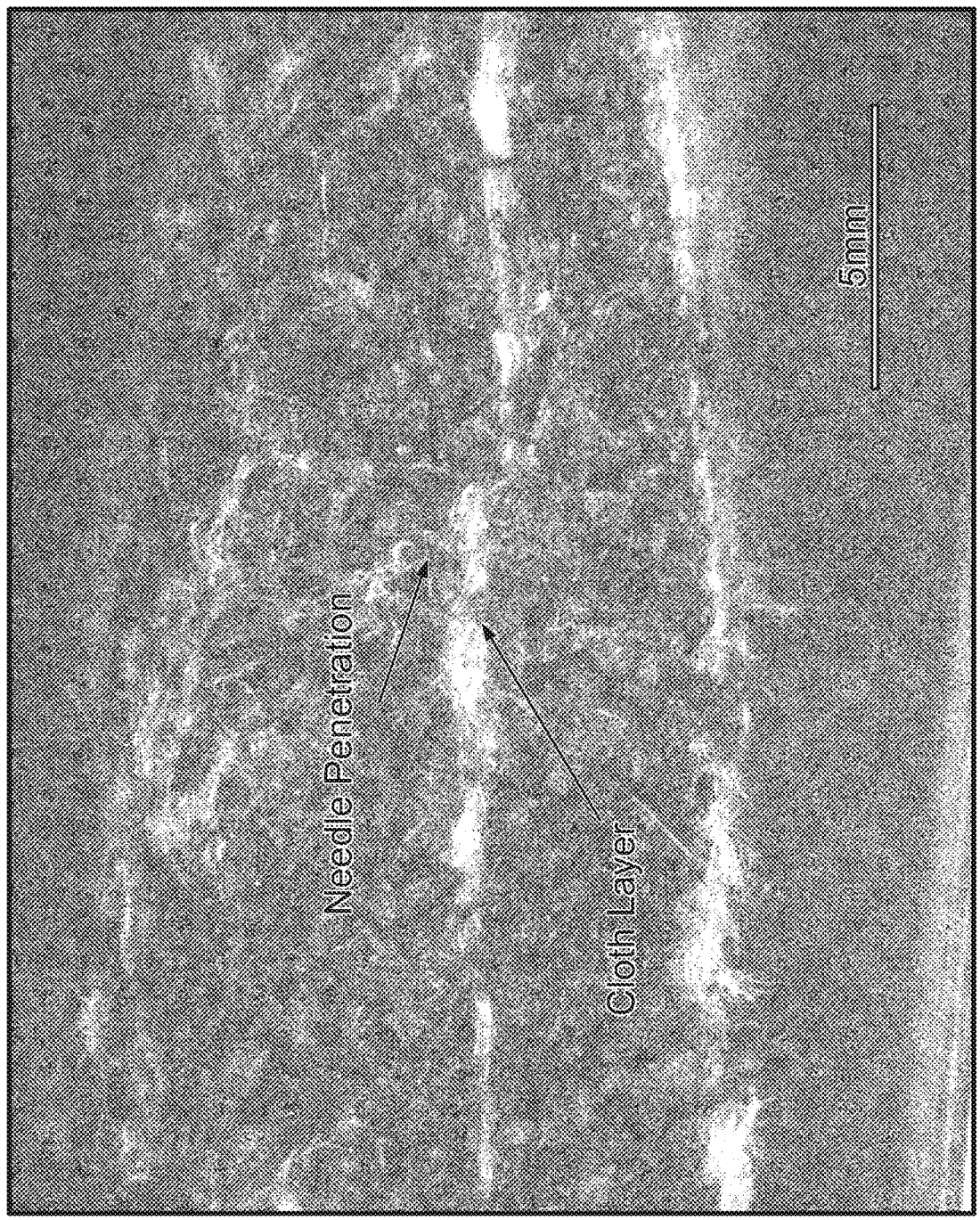
Figure 12C:
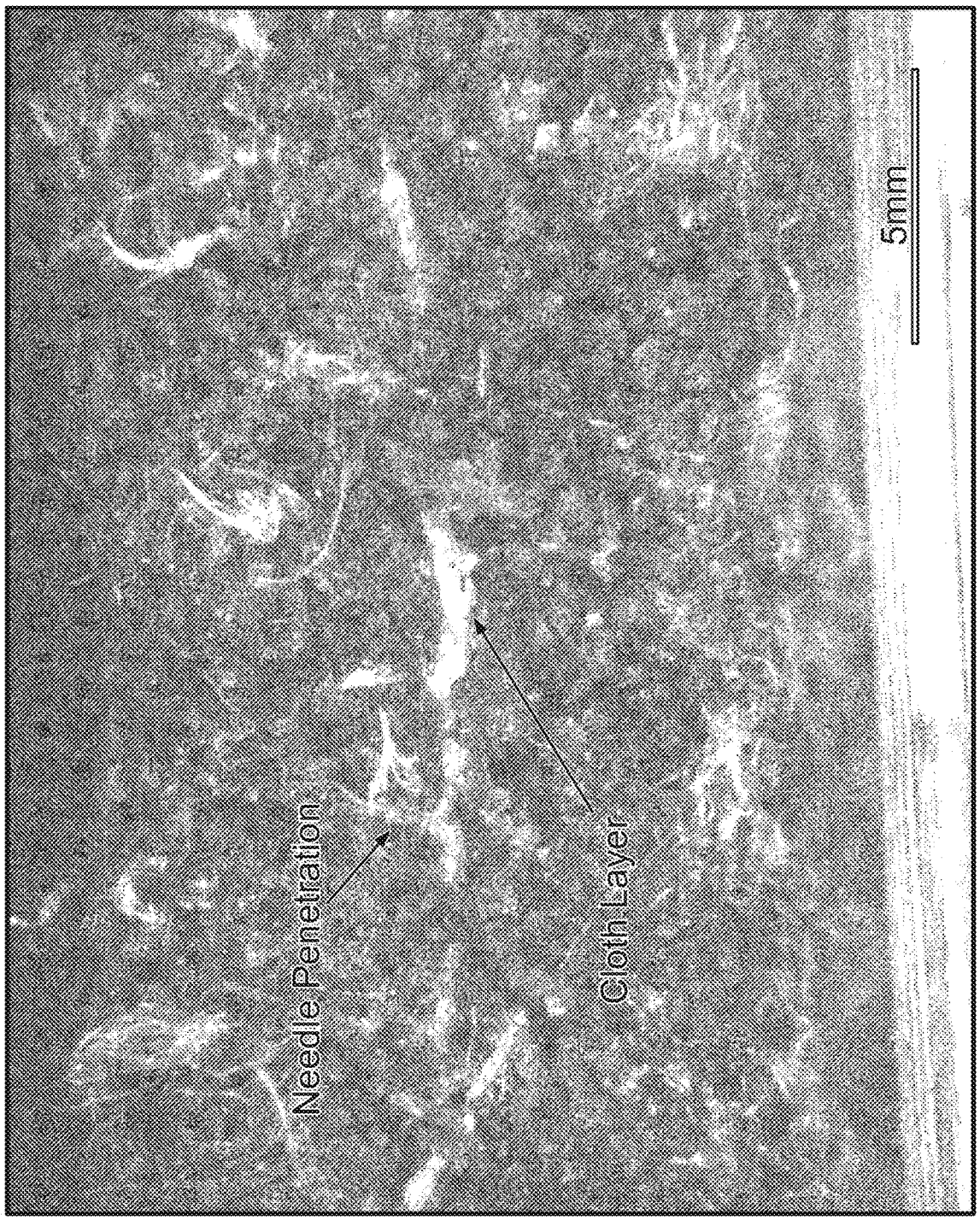
Figure 13:
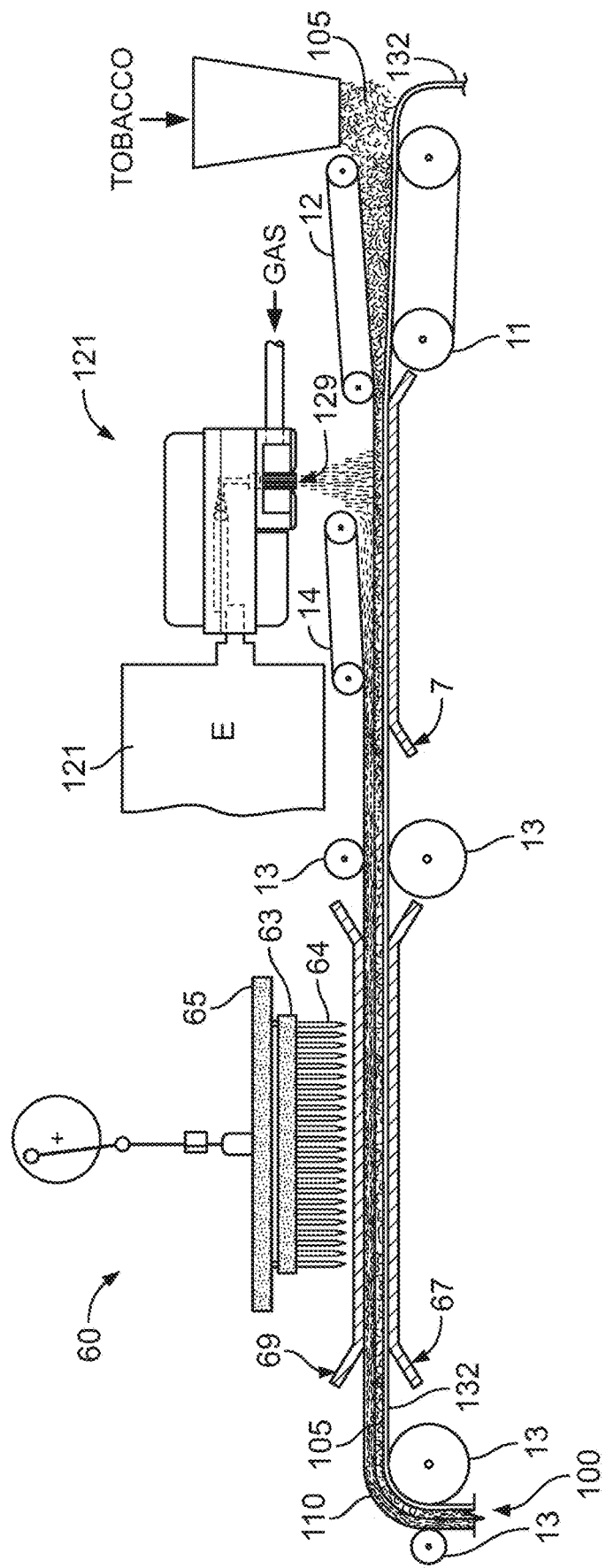
FIG. 13 is a schematic drawing of an exemplary method of making a tobacco-entangled fabric by melt-blowing or spun bonding structural fibers against smokeless tobacco and using a needle loom to intermingle smokeless tobacco with the structural fibers.

FIGS. 12A-C show micrographs of exemplary needled tobacco-entangled fabrics in accordance with some embodiments described herein. FIG. 12A shows a needled tobacco-entangled fabric in which a layer of structural fibers was placed on the needle loom, a layer of smokeless tobacco was placed on top of the structural fibers, another layer of structural fibers was placed on top of the smokeless tobacco, and then needled with a penetration depth of 6 mm for the first pass and 3.2 mm for the second pass. FIG. 12B shows another needled tobacco article in which a backing layer was placed on the needle loom, followed by layers of smokeless tobacco, structural fibers, smokeless tobacco and structural fibers. Following needling, at a needle penetration depth of 8.5 mm, the backing layer was removed (e.g., peeled away), leaving an exposed layer of smokeless tobacco secured by the fibers. FIG. 12C shows yet another needled tobacco-entangled fabric in which a backing layer was placed on the loom, followed by layers of smokeless tobacco, structural fibers and smokeless tobacco. After needling, at a penetration depth of 8.5 mm, the backing layer was removed, leaving two exposed layers of smokeless tobacco secured to both sides of the fiber layer.

Thus, in accordance with some methods of making needled tobacco-entangled fabric 100 or 100' that include smokeless tobacco 105, a needling process includes at least one layer of smokeless tobacco and at least one layer of structural fibers passed through a needle loom 1. In particular embodiments, the first layer placed on the needle loom can be the smokeless tobacco, the structural fiber, or a backing layer that does not contribute fibers to the needled tobacco-entangled fabric and can be removed after the needling process. Using the methods described herein, a needled tobacco-entangled fabric can be manufactured to have one of a number of different combinations of smokeless tobacco layers and structural fiber layers with single passes through the needle loom 1 or multiple passes through the needle loom 1, as the layers are being constructed or after all the layers have been constructed.

The parameters of the actual needling process will depend upon the features of the tobacco's fibrous structures, the features of the structural fibers, the number of layers of each, and the type of loom. Those of skill in the art would understand that the size and shape of the needles as well as the needle density, the penetration depth of the needles, and the feed rate of the material through the loom all can be varied to achieve a nonwoven needled tobacco-entangled fabric having the desired properties. For example, lower needle density and/or shallower needle penetration can be used to produce a less dense, looser tobacco-entangled fabric, while a higher needle density and/or a deeper needle penetration can be used to produce a denser, tighter tobacco-entangled fabric. For example, a puncture density of between about 100 penetrations per square inch (ppsi) and about 2000 ppsi (e.g., about 200 ppsi to about 1000 ppsi; about 400 ppsi to about 800 ppsi) can be used to produce the needled tobacco-entangled fabrics described herein.

Needling can also be used in combination with polymeric structural fibers produced using melt-blowing or spun bonding processes. For example, referring now to FIG. 13, a melt-blown smokeless tobacco/polymeric structural fiber layered composite can be additionally conveyed to a needle loom beam 65. The needle loom beam 65 is configured to reciprocate up and down so that the needles 64 penetrate in and out of corresponding holes in plates 67 and 69. In doing so, the needles penetrate the polymeric structural fibers 110, smokeless tobacco 105, and the fibers of web 132 while barbs on the blade of each needle 64 can pick up any of the fibers, including tobacco fibers, on the downward movement and carry these fibers the depth of the penetration. The reciprocation of the needles 64 occurs repeatedly while the rollers 11, 12, 13, and 14 forces the composite through the needle loom 60 as the needles reorient the fibers from a predominantly horizontal orientation to a generally vertical orientation, thus producing a melt-blown and needled tobacco-entangled fabric.

Given that the needled tobacco-entangled fabric are intended for use in the mouth, the manufacturing process may include a scanning step with a metal detector and/or a magnet to detect any broken needles remaining in the product after needling. Under appropriate needling conditions, needle breakage should be infrequent, but, for precautionary reasons, the needled composite of smokeless tobacco and structural fibers exiting the loom or the cut or punched needled tobacco-entangled fabric can be scanned with a metal detector and/or a magnet for any metal, which would indicate the presence of a fragment from a broken needle.

Spun Lace (Hydroentanglement)

Spun lace, also known as hydroentanglement, is a process that uses fluid forces to lock the fibers together. For example, fine water jets can be directed through a web of structural fibers, which is supported by a conveyor belt, to entangle the structural fibers together and/or with the tobacco's fibrous structures. Entanglement occurs when the water strikes the web and the fibers are deflected. The vigorous agitation within the web causes the fibers to become entangled. For example, a spun lacing process can be used to entangle smokeless tobacco with a web of structural fibers. For example, a cotton web may be spun laced prior to being needled with smokeless tobacco.

The tobacco-entangled fabric, in some embodiments, can be made by layering smokeless tobacco with webs of carded cotton fibers and entangling the tobacco's fibrous structures with the cotton structural fibers by passing fine liquid jets through the layered structure. In other embodiments, smokeless tobacco may be intermingled within a non-cohesive web of structural fibers and spun laced to form the tobacco-entangled fabric. In some embodiments, the smokeless tobacco is treated or encapsulated to retain soluble components during the spun lacing process. In some embodiments, soluble tobacco components are extracted from the smokeless tobacco prior to the spun lacing process and are added back to the finished spun laced product after drying. In some embodiments, the spun-lacing liquid is a solution of flavorants or other additives.

Similar to spun lacing, the tobacco-entangled fabric may also be air-jet entangled using high velocity streams of gas to entangle the fibers. In other embodiments, air-jets can be used to intermingle smokeless tobacco with structural fibers prior to bonding of the structural fibers to form a cohesive and/or dimensionally stable tobacco-entangled fabric.

Thermal Bonding

Thermal bonding is the process of using heat to bond or stabilize a web structure. Polymeric structural fibers can be thermally bonded to stabilize or further stabilize the tobacco-entangled fabric. In some embodiments of thermal bonding, other energy sources are applied to increase the temperature of the polymeric material of the structural fibers and to bond or attach the structural fibers to each other to create a network of fibers with increased fabric strength and dimensionally stability. For example, electrically heated surfaces, ultrasonic bonding, infrared energy, radio frequency energy and microwave energy are particular sources of energy for thermal bonding.

As discussed above, melt-blowing can result in at least some thermal bonding during the process of extruding and attenuating the fibers. Spun bond processes use thermal bonding techniques to bond the fibers after the fibers are deposited. In some embodiments, the fiber web is passed between heated calendar rollers to bond one or more portions of the web. Embossed rolls can also be used to provide point bonding, while adding softness and flexibility to the tobacco-entangled fabric.

Stitch bonding, point bonding and quilting are methods of applying patterns to nonwoven fabrics including tobacco-entangled fabrics. These are forms of thermal bonding typically achieved with ultrasonic bonding processes although other energy sources and related equipment can be used to create particular patterns of bonding within the network of fibers.

Bonding between the structural fibers can also be accomplished by incorporating a low melting temperature polymer into the network of structural fibers. The low melting temperature polymer could be introduced into the network in the form of fibers, beads, or random shapes. The low melting temperature polymer fibers, beads, or random shapes can be dispersed within the network of structural fibers. In some embodiments, the low melting temperature polymer have a melting point of between about 60° C. and 150° C. For example, low molecular weight fibers of polyethylene and polypropylene can be used as the low melting temperature polymer. In other embodiments, the low melting temperature polymer can polyvinyl acetate or various waxes. For example, the lower melting temperature polymers, fibers, beads or random shapes could have a melting point of about 60 C to 150 C. By heating the composite of the structural fibers, the smokeless tobacco, and the low melting temperature polymeric material to a temperature between the melting points of the two different materials, the low melting temperature polymeric material can be selectively melted and thus bond to surrounding fibers to create a desired level of bonding within the tobacco-entangled fabric.

Thermal bonding techniques can also be used in combination with any of the other techniques discussed herein.

Chemical Bonding

Chemically bonding a web by coating the fibers with a binder, such as latex emulsions or solution polymers, is typically used in wet laid processes. For dry laid systems, adhesive materials in the form of beads or small random shapes can be intermingled with the network of structural fibers and activated with heat and/or pressure to bond the network into the tobacco-entangled fabric. In some embodiments, silicone or polyvinyl acetate is used as a chemical adhesive. In some embodiments, sodium alginate is added to the network and then a calcium salt added to make the alginate insoluble within the network and thus bond surrounding fibers. Chemical bonding can be used with any other technique of forming structural fibers and/or intermingling smokeless tobacco with the structural fibers.

Product Components

The tobacco-entangled fabric 100 includes smokeless tobacco 105 and structural fibers 110. At least a portion of the structural fibers 110 can include a mouth-stable material such that the tobacco-entangled fabric remains cohesive when placed in an adult tobacco consumer's mouth. The tobacco-entangled fabric 100 can optionally include one or more flavorants and other additives.

Structural Fibers

A variety of fibers are suitable for use in the tobacco-entangled fabric 100. At least a portion of the structural fibers 110 can be mouth-stable when exposed to saliva and other mouth fluids when placed within an adult tobacco consumer's mouth. As used herein, "mouth-stable" means that the material remains cohesive when placed in an adult tobacco consumer's mouth for 1 hour. The structural fibers 110 can include natural fibers, synthetic fibers, or a combination thereof. Natural fibers include cotton, wool, flax, jute, and bamboo. The structural fibers can include polymeric materials, such as acrylics, nylon, polyester, polyethylene, polypropylene, polyurethane (such as DESMOPAN DP 9370A available from Bayer), polyvinyl chloride, polylactic acid, polyvinyl alcohol, and rayon, viscose or other modified cellulosic fibers, and combinations thereof. In some embodiments, a mouth-stable fiber is biodegradable. As used herein, "biodegradable" means a material that meets the requirements of ASTM D6400-04, Standard Specification for Compostable Plastics. Suitable biodegradable materials will decompose in natural aerobic (composting) and anaerobic (landfill) environments, yet remain stable within a consumer's mouth for a suitable period of time (e.g., 1 hour). Examples of biodegradable materials include aliphatic polyesters; polyhydroxyalkanoates such as poly-3-hydroxybutyrate, polyhydroxyvalerate, and polyhydroxyhexanoate; polylactic acid; polybutylene succinate; polycaprolactone; polyanhydrides; polyvinyl alcohol; various starch derivatives; and cellulose esters like cellulose acetate and nitrocellulose and their derivatives (e.g., celluloid).

The structural fibers can include multiple materials. In some embodiments, structural fibers of a first material are interspersed or layered with structural fibers of a second material. For example, a lower melting temperature polymer can function as a binder which may be a separate fiber interspersed with higher melting structural fibers. In other embodiments, structural fibers can be bicomponent or multicomponent fibers made of different materials. For example, a lower melting sheath can surround a higher melting core, which can help with thermal bonding processes. The components of a multi-component fiber can also be extruded in a side-by-side configuration. For example, different polymeric materials can be co-extruded and drawn in a melt-blowing or spun bond process to form the multi-component structural fibers.

The structural fibers can also be formed from multicomponent fibers that fibrillate to become multiple fibers. The multi component fibers can become fibrillated by applying force to the fibers. For example, hydroentanglement can be used to fibrillate a multicomponent fiber. In other embodiments, a pounding and/or crushing force (e.g., a hammer or pressure roller) can be applied to the multicomponent fiber. In some embodiments, a needling process can fibrillate a multicomponent fiber. In other embodiments, multicomponenet fibers can be needled without becoming fibrillated, but become fibrillated in subsequent processes and/or during use by an adult tobacco consumer. In some embodiments, one multicomponent fiber can be fibrillated into many (e.g., 10 or more) microfibers. In certain embodiments, the structural fibers include at least one mouth-stable material and at least one mouth-dissolvable material such that the tobacco-entangled fabric will loosen but remain cohesive as the mouth-dissolvable material dissolves away. In some embodiments, the network of structural fibers includes mouth-dissolvable fibers and mouth-stable fibers. As used herein, "mouth-dissolvable" means that the material breaks down within 1 hour after being exposed to saliva and other mouth fluids when placed in an adult tobacco consumer's mouth. Mouth-dissolvable materials include hydroxypropyl cellulose (HPC), methyl hydroxypropyl cellulose (HPMC), polyvinyl alcohol (PVOH), PVP, polyethylene oxide (PEO), starch and others. Mouth-dissolvable materials could be combined with flavors, sweeteners, milled tobacco and other functional ingredients. In other embodiments, multi-component fibers include a mouth-stable material and a mouth-dissolvable material.

In some embodiments, the structural fibers 110 include reconstituted cellulosic fibers. Reconstituted cellulosic fibers can be created from various woods and annual plants by physically dissolving the wood or plant material in a suitable solvent, such as methylmorpholine oxide (MNNO) monohydrate. The concentration of cellulose in the solution can be between 6 weight and 15 weight percent. The solution can then be spun (e.g., melt-blown or spun bond) at a temperature of between 70° C. and 120° C. to create reconstituted cellulosic fibers. In some embodiments, the reconstituted cellulosic fibers are made using tobacco material (e.g., tobacco stems). Reconstituted tobacco cellulosic fibers can then be entangled with smokeless tobacco having natural cellulosic fibers to create a tobacco-entangled fabric having tobacco-derived structural fibers. The reconstituting process changes the composition of the tobacco and removes many of the soluble tobacco components normally found in smokeless tobacco.

In still other embodiments, milled tobacco could be combined into a polymeric structural fiber such that the polymeric material at least partially encapsulates the milled tobacco. For example, milled tobacco could be added to a molten polymer (e.g., polypropylene) in amounts from about 10% by weight up to about 80% by weight and extruded in a melt-blowing or spun bond process. The milled tobacco can provide a unique texture to the structural fibers while the polymeric material remains mouth stable and cohesive. The amount of structural fiber 110 used in the tobacco-entangled fabric 100 can depend on the desired flavor profile and desired mouth feel. In some embodiments, the tobacco-entangled fabric 100 includes at least 0.5 weight percent structural fibers, which can increase the likelihood that the tobacco-entangled fabric 100 maintains its cohesion during packaging, transport, handling, and use by an adult tobacco consumer. In some embodiments, the tobacco-entangled fabric 100 includes up to 20 weight percent structural fibers. In some embodiments, the tobacco-entangled fabric 100 includes between 0.5 and 10 weight percent structural fibers. For example, the tobacco-entangled fabric 100 can have between 1.0 and 7.0 weight percent structural fibers.

Tobacco

Smokeless tobacco is tobacco suitable for use in an orally used tobacco product. By "smokeless tobacco" it is meant a part, e.g., leaves, and stems, of a member of the genus *Nicotiana* that has been processed. Exemplary species of tobacco include *N. rustica, N. tabacum, N. tomentosiformis*, and *N. sylvestris*. Suitable tobaccos include fermented and unfermented tobaccos. In addition to fermentation, the tobacco can be processed using other techniques. For example, tobacco can be processed by heat treatment (e.g., cooking, toasting), flavoring, enzyme treatment, expansion and/or curing. Both fermented and non-fermented tobaccos can be processed using these techniques. In other embodiments, the tobacco can be unprocessed tobacco. Specific examples of suitable processed tobaccos include dark air-cured, dark fire cured, burley, flue cured, and cigar filler or wrapper, as well as the products from the whole leaf stemming operation. In some embodiments, smokeless tobacco includes up to 70% dark tobacco on a fresh weight basis. For example, tobacco can be conditioned by heating, sweating and/or pasteurizing steps as described in U.S. Publication Nos. 2004/0118422 or 2005/0178398. Fermenting typically is characterized by high initial moisture content, heat generation, and a 10 to 20% loss of dry weight. See, e.g., U.S. Pat. Nos. 4,528,993; 4,660,577; 4,848,373; and 5,372,149. In addition to modifying the aroma of the leaf, fermentation can change either or both the color and texture of a leaf. Also during the fermentation process, evolution gases can be produced, oxygen can be taken up, the pH can change, and the amount of water retained can change. See, for example, U.S. Publication No. 2005/0178398 and Tso (1999, Chapter 1 in Tobacco, Production, Chemistry and Technology, Davis & Nielsen, eds., Blackwell Publishing, Oxford). Cured, or cured and fermented tobacco can be further processed (e.g., cut, expanded, blended, milled or comminuted) prior to incorporation into the smokeless tobacco product. The tobacco, in some embodiments, is long cut fermented cured moist tobacco having an oven volatiles content of between 48 and 50 weight percent prior to mixing with the structural fibers and optionally flavorants and other additives.

The tobacco can, in some embodiments, be prepared from plants having less than 20 µg of DVT per $cm^2$ of green leaf tissue. For example, the tobacco particles can be selected from the tobaccos described in U.S. Patent Publication No. 2008/0209586, which is hereby incorporated by reference. Tobacco compositions containing tobacco from such low-DVT varieties exhibits improved flavor characteristics in sensory panel evaluations when compared to tobacco or tobacco compositions that do not have reduced levels of DVTs.

Green leaf tobacco can be cured using conventional means, e.g., flue-cured, barn-cured, fire-cured, air-cured or sun-cured. See, for example, Tso (1999, Chapter 1 in Tobacco, Production, Chemistry and Technology, Davis & Nielsen, eds., Blackwell Publishing, Oxford) for a description of different types of curing methods. Cured tobacco is usually aged in a wooden drum (i.e., a hogshead) or cardboard cartons in compressed conditions for several years (e.g., two to five years), at a moisture content ranging from 10% to about 25%. See, U.S. Pat. Nos. 4,516,590 and 5,372,149. Cured and aged tobacco then can be further processed. Further processing includes conditioning the tobacco under vacuum with or without the introduction of steam at various temperatures, pasteurization, and fermentation. Fermentation typically is characterized by high initial moisture content, heat generation, and a 10 to 20% loss of dry weight. See, e.g., U.S. Pat. Nos. 4,528,993, 4,660,577, 4,848,373, 5,372,149; U.S. Publication No. 2005/0178398; and Tso (1999, Chapter 1 in Tobacco, Production, Chemistry and Technology, Davis & Nielsen, eds., Blackwell Publishing, Oxford). Cure, aged, and fermented smokeless tobacco can be further processed (e.g., cut, shredded, expanded, or blended). See, for example, U.S. Pat. Nos. 4,528,993; 4,660, 577; and 4,987,907.

The smokeless tobacco can be processed to a desired size. For example, long cut smokeless tobacco typically is cut or shredded into widths of about 10 cuts/inch up to about 110 cuts/inch and lengths of about 0.1 inches up to about 1 inch. Double cut smokeless tobacco can have a range of particle sizes such that about 70% of the double cut smokeless tobacco falls between the mesh sizes of −20 mesh and 80 mesh. Accordingly, the smokeless tobacco can include fibrous structures that become entangled with the structural fibers. Although powdered or milled tobacco can also be included in the smokeless tobacco products described herein (e.g., within the structural fibers), the fibrous structures in powdered and milled tobacco are not of sufficient length to permit entanglement with structural fibers.

The smokeless tobacco can have a total oven volatiles content of about 10% by weight or greater; about 20% by weight or greater; about 40% by weight or greater; about 15% by weight to about 25% by weight; about 20% by weight to about 30% by weight; about 30% by weight to about 50% by weight; about 45% by weight to about 65% by weight; or about 50% by weight to about 60% by weight. Those of skill in the art will appreciate that "moist" smokeless tobacco typically refers to tobacco that has an oven volatiles content of between about 40% by weight and about 60% by weight (e.g., about 45% by weight to about 55% by weight, or about 50% by weight). As used herein, "oven volatiles" are determined by calculating the percentage of weight loss for a sample after drying the sample in a pre-warmed forced draft oven at 110° C. for 3.25 hours. The tobacco-entangled fabric can have a different overall oven volatiles content than the oven volatiles content of the smokeless tobacco used to make the tobacco-entangled fabric. The processing steps described herein can reduce or increase the oven volatiles content. The overall oven volatiles content of the tobacco-entangled fabric is discussed below.

The tobacco-entangled fabric can include between 15 weight percent and 85 weight percent smokeless tobacco on a dry weight basis. The amount of smokeless tobacco in a fabric piece on a dry weight basis is calculated after drying the tobacco-entangled fabric in a pre-warmed forced draft oven at 110° C. for 3.25 hours. The remaining non-volatile material is then separated into tobacco material and structural fiber material. The percent smokeless tobacco in the tobacco-entangled fabric is calculated as the weight smokeless tobacco divided by the total weight of the non-volatile materials. In some embodiments, the tobacco-entangled fabric includes between 20 and 60 weight percent tobacco on a dry weight basis. In some embodiments, the tobacco-entangled fabric includes at least 28 weight percent tobacco on a dry weight basis. For example, a tobacco-entangled fabric can include a total oven volatiles content of about 57 weight percent, about 3 weight percent structural fibers (such as cotton), and about 40 weight percent smokeless tobacco on a dry weight basis.

In some embodiments, a plant material other than tobacco is used as a tobacco substitute in the tobacco-entangled fabric. The tobacco substitute can be a herbal composition. Herbs and other edible plants can be categorized generally as culinary herbs (e.g., thyme, lavender, rosemary, coriander, dill, mint, peppermint) and medicinal herbs (e.g., Dahlias, Cinchona, Foxglove, Meadowsweet, *Echinacea*, Elderberry, Willow bark). In some embodiments, the tobacco is replaced with a mixture of non-tobacco plant material. Such non-tobacco compositions may have a number of different primary ingredients, including but not limited to, tea leaves, red clover, coconut flakes, mint leaves, *ginseng*, apple, corn silk, grape leaf, and basil leaf. The plant material typically has a total oven volatiles content of about 10% by weight or greater, e.g., about 20% by weight or greater; about 40% by weight or greater; about 15% by weight to about 25% by weight; about 20% by weight to about 30% by weight; about 30% by weight to about 50% by weight; about 45% by weight to about 65% by weight; or about 50% by weight to about 60% by weight.

Flavorants and Additives

Figure 15A:
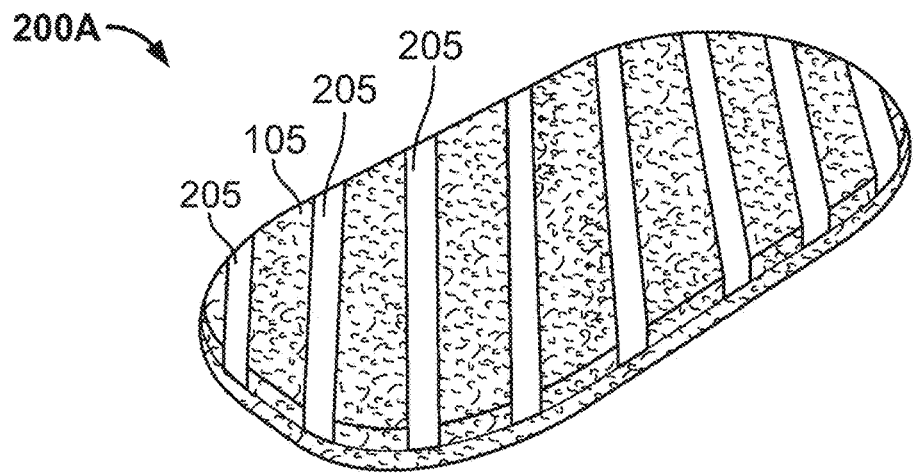
FIG. 15A shows a piece of tobacco-entangled fabric onto which flavor strips have been applied.

Flavors and other additives can be included in the compositions described herein, and can be added during a variety of different stages of the various processes described herein. For example, any of the initial components, including the structural fibers, can be provided in a flavored form. In some embodiments, flavorants and/or other additives are included in the smokeless tobacco. Flavorants and/or other additives can be absorbed into to the tobacco-entangled fabric 100 after the structural fibers and the tobacco's cellulosic fibers are combined. In other embodiments, flavorants and/or other additives are mixed with the structural fibers prior to mixing in the smokeless tobacco. Alternatively or additionally, flavor can be applied to the tobacco-entangled fabric prior to being further processed (e.g., cut or punched into shapes), or flavor can be applied to the tobacco-entangled fabric prior to packaging. Referring to FIG. 15A, for example, some embodiments of a tobacco-entangled fabric 200A are equipped with flavors, in the form of flavor strips 205.

Suitable flavorants include wintergreen, cherry and berry type flavorants, various liqueurs and liquors such as Dramboui, bourbon, scotch, whiskey, spearmint, peppermint, lavender, cinnamon, cardamon, *apium* graveolents, clove, cascarilla, nutmeg, sandalwood, bergamot, geranium, honey essence, rose oil, vanilla, lemon oil, orange oil, Japanese mint, *cassia*, caraway, cognac, jasmin, chamomile, menthol, ilangilang, sage, fennel, piment, ginger, anise, coriander, coffee, liquorish, and mint oils from a species of the genus Mentha. Mint oils useful in particular embodiments of the tobacco-entangled fabric 100 include spearmint and peppermint.

In some embodiments, flavorants are coated on the structural fibers. For example, flavorants can be included in a dissolvable carrier and dispersed into the tobacco-entangled fabric. Flavorants can also be included in the form of flavor beads, which can be dispersed within the tobacco-entangled fabric. For example, the tobacco-entangled fabric could include the beads described in U.S. Patent Application Publication 2010/0170522, which is hereby incorporated by reference. In some embodiments, flavor bead are positioned within a tobacco-entangled fabric pouch. Other arrangements of tobacco-entangled fabric combined with flavor beads are also contemplated.

In some embodiments, the amount of flavorants in the tobacco-entangled fabric 100 is limited to less than 10 weight percent in sum. In some embodiments, the amount of flavorants in the tobacco-entangled fabric 100 is limited to be less than 5 weight percent in sum. For example, certain flavorants can be included in the tobacco-entangled fabric 100 in amounts of about 3 weight percent.

Other optional additives include as fillers (e.g., starch, di-calcium phosphate, lactose, sorbitol, mannitol, and microcrystalline cellulose), soluble fiber (e.g., Fibersol from Matsushita), calcium carbonate, dicalcium phosphate, calcium sulfate, and clays), lubricants (e.g., lecithin, stearic acid, hydrogenated vegetable oil, mineral oil, polyethylene glycol 4000-6000 (PEG), sodium lauryl sulfate (SLS), glyceryl palmitostearate, sodium benzoate, sodium stearyl fumarate, talc, and stearates (e.g., Mg or K), and waxes (e.g., glycerol monostearate, propylene glycol monostearate, and acetylated monoglycerides), plasticizers (e.g., glycerine, propylene glycol, polyethylene glycol, sorbitol, mannitol, triacetin, and 1,3 butane diol), stabilizers (e.g., ascorbic acid and monosterol citrate, BHT, or BHA), artificial sweeteners (e.g., sucralose, saccharin, and aspartame), disintegrating agents (e.g., starch, sodium starch glycolate, cross caramellose, cross linked PVP), pH stabilizers, or other compounds (e.g., vegetable oils, surfactants, and preservatives). Some compounds display functional attributes that fall into more than one of these categories. For example, propylene glycol can act as both a plasticizer and a lubricant and sorbitol can act as both a filler and a plasticizer.

Oven volatiles, such as water, may also be added to the tobacco-entangled fabric 100 to bring the oven volatiles content of the tobacco-entangled fabric into a desired range. In some embodiments, flavorants and other additives are included in a hydrating liquid.

Oven Volatiles

The tobacco-entangled fabric 100 can have a total oven volatiles content of between 10 and 65 weight percent. In some embodiments, the overall oven volatiles content is 10% by weight or greater, e.g., about 20% by weight or greater; about 40% by weight or greater; about 15% by weight to about 25% by weight; about 20% by weight to about 30% by weight; about 30% by weight to about 50% by weight; about 45% by weight to about 65% by weight; or about 50% by weight to about 60% by weight. The oven volatiles include water and other volatile compounds, which can be a part of the tobacco, the structural fibers, the flavorants, and/or other additives. As used herein, the "oven volatiles" are determined by calculating the percentage of weight loss for a sample after drying the sample in a pre-warmed forced draft oven at 110° C. for 3.25 hours. The structural fibers may absorb some of the oven volatiles during various processes, however the processes can be controlled to have an overall oven volatiles content in a desired range. In some embodiments, water and/or other volatiles are added to the tobacco-entangled fabric to raise the oven volatiles content to a desired range. In some embodiments, the oven volatiles content of the tobacco-entangled fabric 100 is between 50 and 61 weight percent. For example, the oven volatiles content of smokeless tobacco 105 used in the various processes described herein can be about 57 weight percent and the target oven volatiles content of the resulting tobacco-entangled fabric can be about 57 weight percent. In other embodiments, the overall oven volatiles content can be between 10 and 30 weight percent.

Product Configurations

Figure 14A:
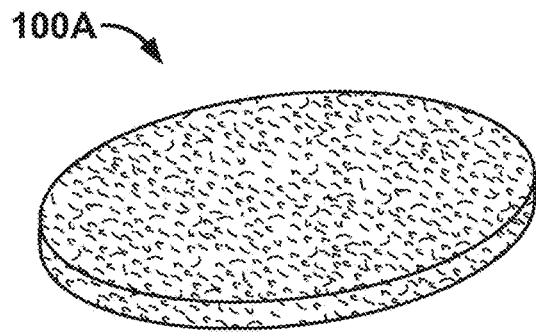
FIGS. 14A-L show exemplary various shapes into which a tobacco-entangled fabric can be cut or formed.
Figure 14B:
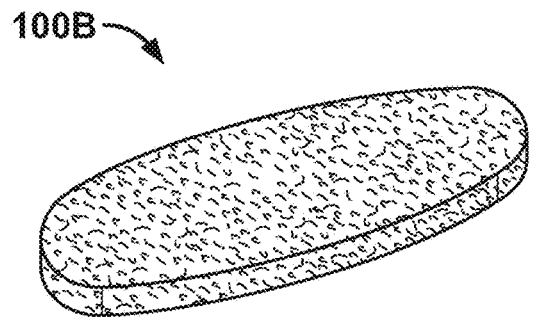
Figure 14C:
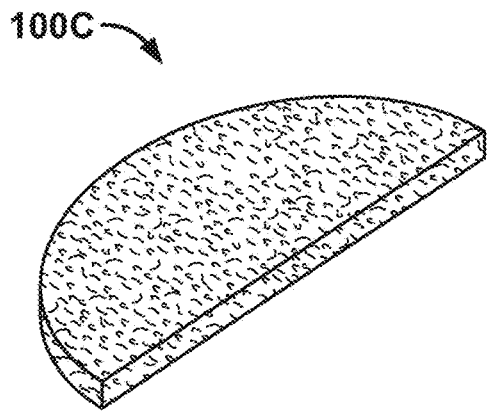
Figure 14D:
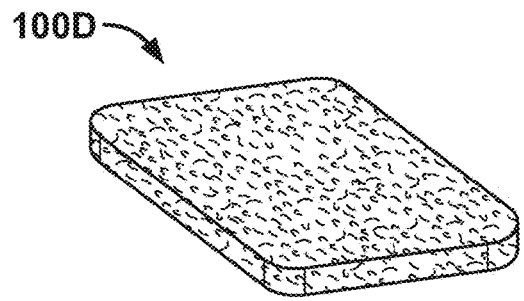
Figure 14E:
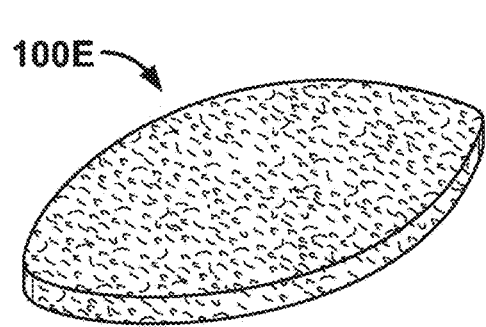
Figure 14F:
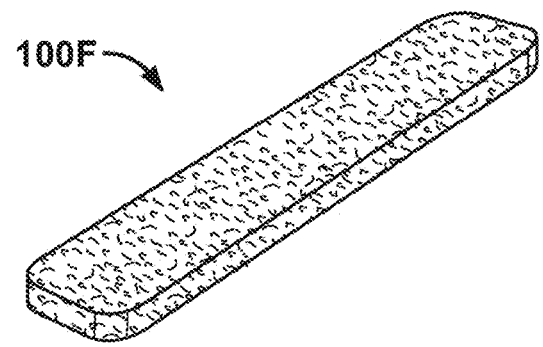
Figure 14G:
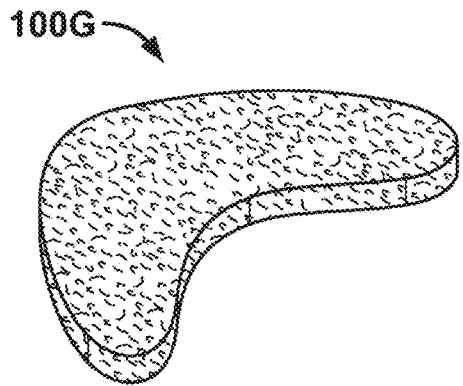
Figure 14H:
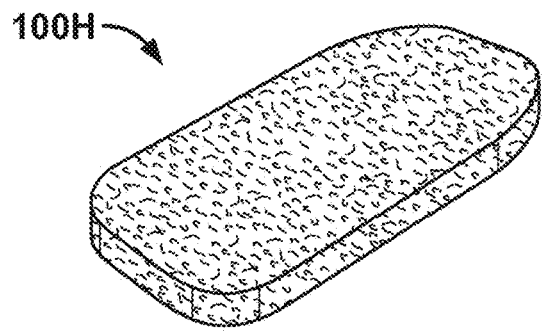
Figure 14I:
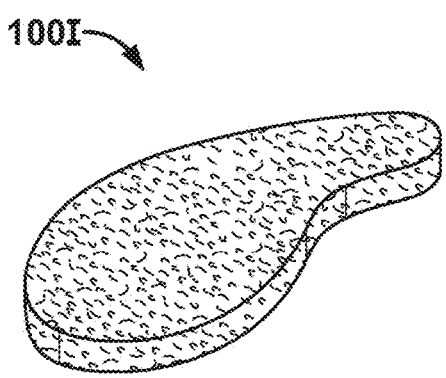
Figure 14J:
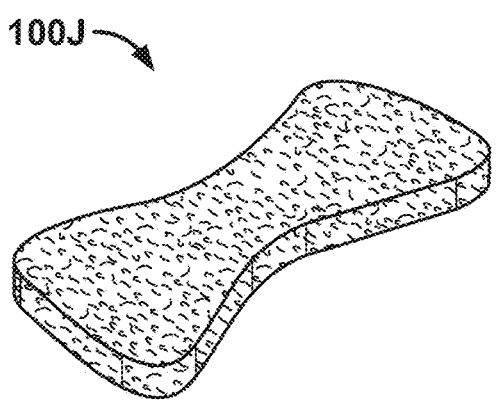
Figure 14K:
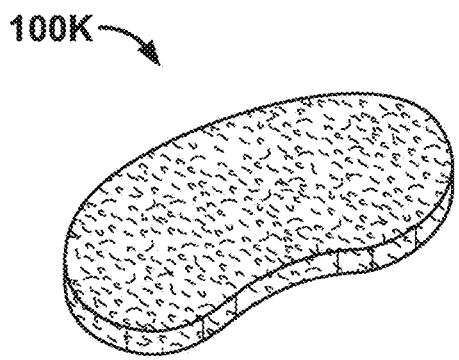
Figure 14L:
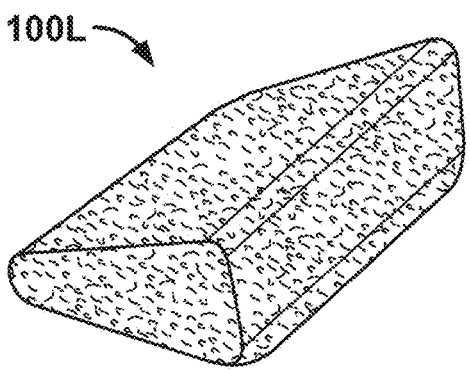

A smokeless tobacco product comprising a tobacco-entangled fabric as described herein can have a number of different configurations, e.g., can have the configuration of the piece of tobacco-entangled fabric 100 depicted in FIG. 1 or 11, or can have a shape or a layer structure that is different from the particular embodiment depicted in FIG. 1 or 11. For example, referring to FIGS. 14A-K, the tobacco-entangled fabric 100A-K can be formed in a shape that promotes improved oral positioning for the adult tobacco consumer, improved packaging characteristics, or both. In some circumstances, the tobacco-entangled fabric 100 can be configured to be: (A) an elliptical shaped tobacco-entangled fabric 100A; (B) an elongated elliptical shaped tobacco-entangled fabric 100B; (C) a semi-circular tobacco-entangled fabric 100C; (D) a square- or rectangular-shaped tobacco-entangled fabric 100D; (E) a football-shaped tobacco-entangled fabric 100E; (F) an elongated rectangular-shaped tobacco-entangled fabric 100F; (G) boomerang-shaped tobacco-entangled fabric 100G; (H) a rounded-edge rectangular-shaped tobacco-entangled fabric 100H; (I) teardrop- or comma-shaped tobacco-entangled fabric 100I; (J) bowtie-shaped tobacco-entangled fabric 100J; and (K) peanut-shaped tobacco-entangled fabric 100K. Alternatively, the tobacco-entangled fabric 100 can be shaped to have different thicknesses or dimensionality, such that a beveled article (e.g., a wedge) is produced (see, for example, the tobacco-entangled fabric depicted in FIG. 14L) or a hemispherical shape is produced.

The tobacco-entangled fabric can be cut or sliced longitudinally or laterally to produce a variety of smokeless tobacco compositions having different tobacco/fiber profiles. For example, the texture (e.g., softness and comfort in the mouth), taste, level of oven volatiles (e.g., moisture), flavor release profile, and overall adult tobacco consumer satisfaction of a tobacco-entangled fabric will be dependent upon the concentration and distribution of tobacco material, and the number of layers, thicknesses, and dimensions and type(s) of melt-blown polymeric fibers, all of which effects the density and integrity of the final product. Similar to previously described embodiments, the tobacco-entangled fabric pieces 100A-L depicted in FIGS. 14A-L can be configured to include a predetermined portion of smokeless tobacco 105, and the smokeless tobacco 105 can be exposed along a number of exterior surfaces of the articles 100A-L.

Further, the articles 100A-L can be packaged in a container 52 with a lid 54 (FIG. 1) along with a plurality of similarly shaped tobacco-entangled fabric pieces 100A-L so that an adult tobacco consumer can conveniently select any of the similarly shaped pieces of tobacco-entangled fabric pieces 100 therein for use in the mouth and receive a substantially identical portion of the smokeless tobacco 105.

Referring to FIG. 15A, some embodiments of a tobacco-entangled fabric 200A can be equipped with flavorants, in the form of flavor strips 205. The flavor strips 205 can be applied to the tobacco-entangled fabric such that both the smokeless tobacco 105 and the flavor strip 205 are exposed along exterior surfaces of the tobacco-entangled fabric piece 200A. In some embodiments, the flavor strips 205 are applied to the tobacco-entangled fabric 200A before cutting or punching the tobacco-entangled fabric into the desired shape.

Figure 15B:
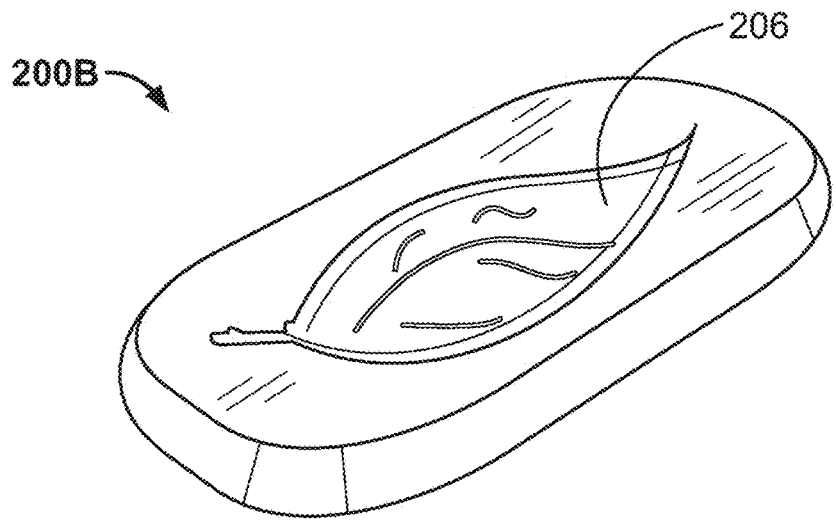
FIG. 15B shows a piece of tobacco-entangled fabric that has been wrapped or coated.
Figure 15C:
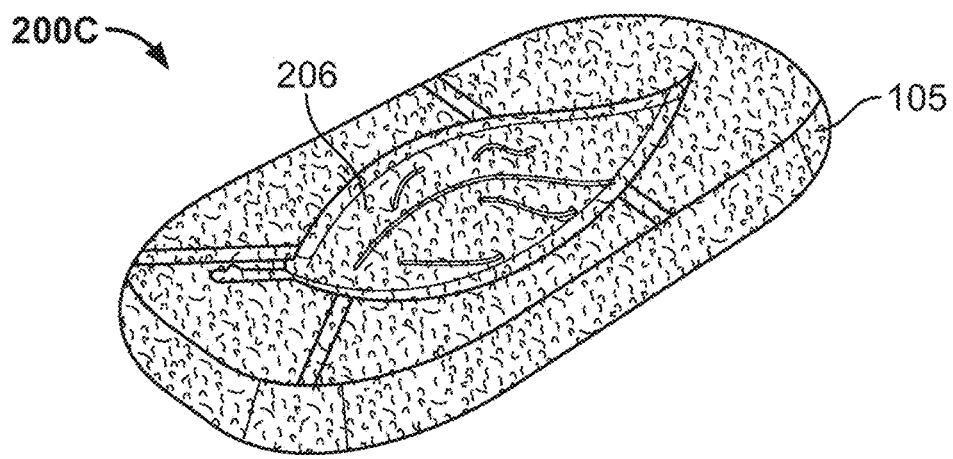

The tobacco-entangled fabric can be manipulated in a number of different ways. For example, as shown in FIG. 15B, particular embodiments of the tobacco-entangled fabric 200B can be wrapped or coated in an edible or dissolvable film. The dissolvable film can readily dissipate when the tobacco-entangled fabric 200B is placed in an adult tobacco consumer's mouth, thereby providing the adult tobacco consumer with the tactile feel of the smokeless tobacco 105 along the exterior of the article 200B once dissolved. In addition, or in the alternative, some embodiments of the tobacco-entangled fabric can be embossed or stamped with a design (e.g., a logo, an image, a trademark, a product name, or the like). For example, as shown in FIG. 15C, the tobacco-entangled fabric 200C can be embossed or stamped with any type of design 206 including, but not limited to, an image. The design can be formed directly into or onto smokeless tobacco material 105 arranged along the exterior of the tobacco-entangled fabric 200C. In other embodiments, a structural fiber exterior can be embossed. The design 206 also can be embossed or stamped into those embodiments having a dissolvable film applied thereto, as illustrated in FIG. 15B.

In some embodiments, the tobacco-entangled fabric is used in combination with other tobacco and non-tobacco ingredients to form a variety of smokeless tobacco products. For example, the tobacco-entangled fabric can form a pouch that surrounds a mass of smokeless tobacco and/or other ingredients. The contents of the pouch can include flavor beads as discussed above. Other smokeless tobacco products including tobacco-entangled fabric are also contemplated.

Packaging

Figure 16A:
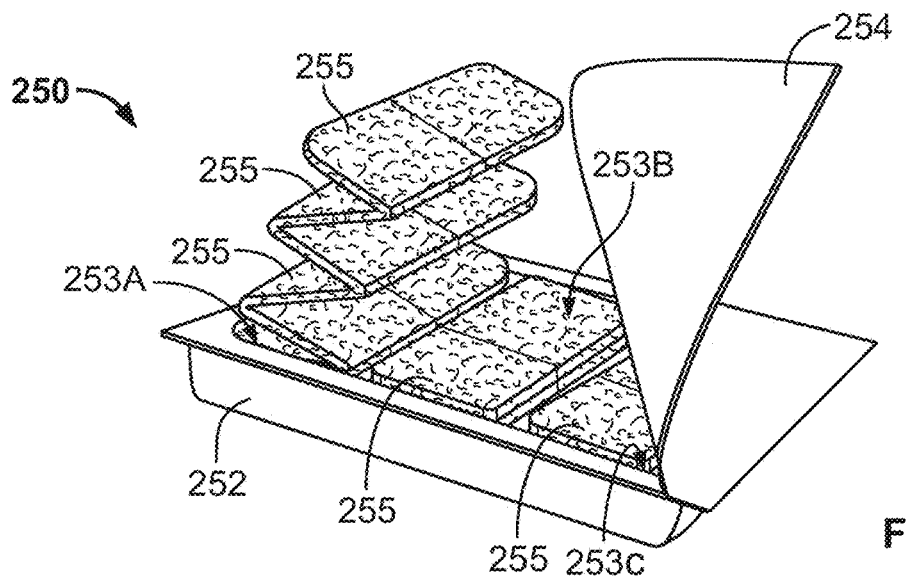
FIGS. 16A-C show representative packaging containers for tobacco-entangled fabrics.

The tobacco-entangled fabric described herein can be packaged in any number of ways for convenient use. As previously described, the tobacco-entangled fabric can be packaged in individual pieces of any shape or size and contained, for example, in a generally cylindrical container 52 with a lid 54 (FIG. 1). Alternatively, as shown in FIG. 16A, the melt-blown tobacco-entangled fabric can be packaged in a system including a tray container 252 with a peel-away lid 254. The tray container 252 can include a plurality of isolated interior spaces 253A-C so as to store separate stacks of the tobacco-entangled fabric 255. The tobacco-entangled fabric in the stacks can be folded upon itself. In some circumstances, the peel-away lid 254 can be resealable in that it can be repeatedly secured to the container 252.

Figure 16B:
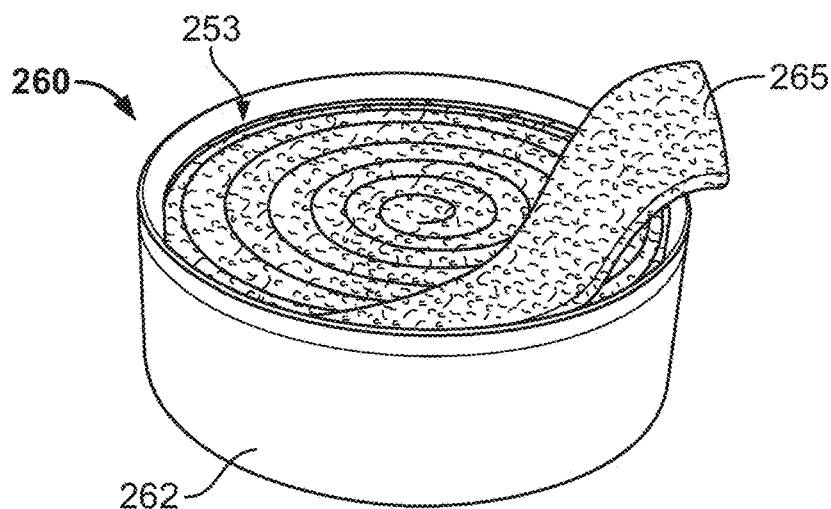
Figure 16C:
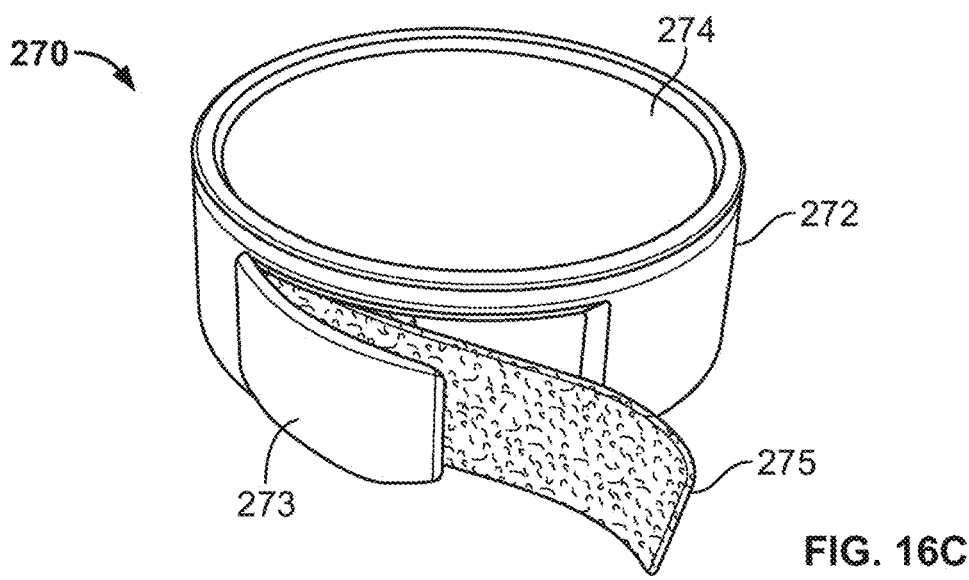

In another alternative system 260 depicted in FIG. 16B, tobacco-entangled fabric can be cut into a strip of a particular width and packaged as a coil (e.g., rolled upon itself). As such, an adult tobacco consumer can readily tear or break away any length of the coil of tobacco-entangled fabric 265 for use in the mouth. In some cases, the coil of tobacco-entangled fabric 265 can include perforations or scores that permit the adult tobacco consumer to more easily separate selected lengths of the coil 265. The coil of tobacco-entangled fabric can be contained in a container 262 having a cylindrical interior space 253 that is sized to receive the coil 265. In yet another alternative system 270 depicted in FIG. 16C, the coil of tobacco-entangled fabric 275 can be packaged in a container 272 that has a clipping device 273 on the side. The coil 275 can be stored in the container 272 having a lid thereon 274 (which may be removable), and the clipping device 273 can be hingedly connected to a sidewall of the container 272 so that a selected length of the coil 275 can be drawn out and readily clipped away. As such, the adult tobacco consumer can select the particular size of melt-blown smokeless tobacco article to be inserted into the mouth.

In accordance with some embodiments and examples described herein, there may be employed some conventional techniques within the skill of the art. Such techniques are explained fully in the literature. Some embodiments will be further described in the following examples, which do not limit the scope of the methods and compositions of matter described in the claims.

Example

Figure 17:
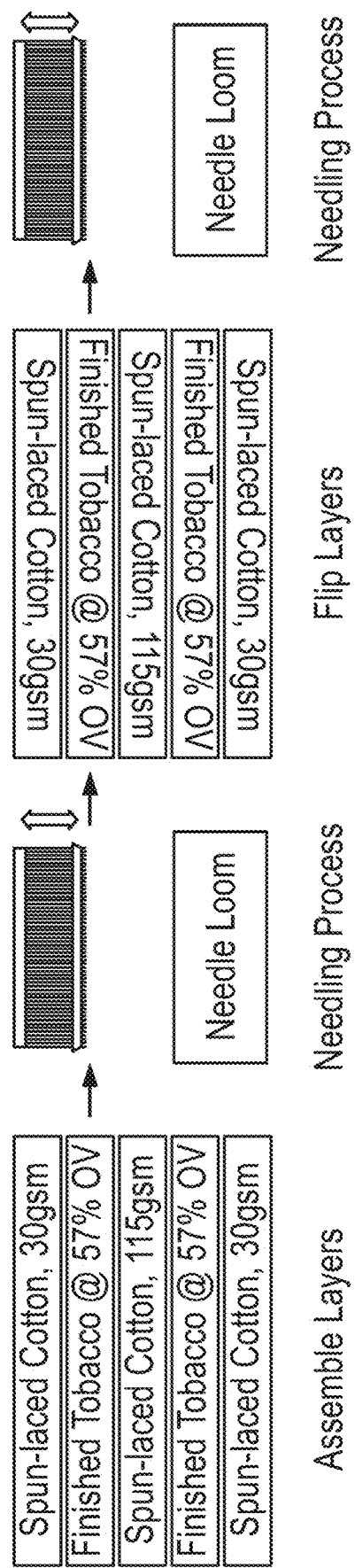
FIG. 17 is a schematic showing an exemplary method for needling a multilayered combination of cotton structural fibers and smokeless tobacco to produce a tobacco-entangled fabric.

A needled tobacco-entangled fabric was made as diagrammed in FIG. 17. An approximate 0.75 inch-thick layer of SKOAL Long Cut smokeless tobacco (Wintergreen flavored) having a moisture (i.e. oven volatiles) content of 57% was placed on a spun laced cotton nonwoven web having a basis weight of 30 grams per square meter (gsm); the tobacco layer was then covered with another layer of spun laced cotton nonwoven having a basis weight of 115 gsm. Another approximate 0.75 inch-thick layer of SKOAL Long Cut smokeless tobacco (Wintergreen flavored) was placed on top of the 115 gsm layer and another layer of spun laced cotton nonwoven having a basis weight of 30 gsm was placed on top of the second layer of tobacco. The layered composition was passed through the loom, turned over, and passed through the loom again. Star blade needles were used at 400 ppsi (penetrations per square inch) at a penetration depth of 7 mm. The loom was a Hunter Fiber-Locker loom set to have a feed rate of 41 inches/minute, a rocker position of 0.25 and a penetration rate of 1405 ppsi. The loom carriage position for a 5/16 penetration was set at 2 and 56/64 inch. The loom gap penetration setting was set at 48/64 inch for a first pass and at 32/64 inch for a second pass. The appearance and integrity of the final product was excellent. The final product was easy to cut into squares and the tobacco remained in place. The spun laced cotton nonwoven webs were obtained from Winner Medical Group, Inc., Guangdong, China.

OTHER EMBODIMENTS

It is to be understood that, while the invention has been described herein in conjunction with a number of different aspects, the foregoing description of the various aspects is intended to illustrate and not limit the scope of the invention, which is defined by the scope of the appended claims. Other aspects, advantages, and modifications are within the scope of the following claims.

Disclosed are methods and compositions that can be used for, can be used in conjunction with, can be used in preparation for, or are products of the disclosed methods and compositions. These and other materials are disclosed herein, and it is understood that combinations, subsets, interactions, groups, etc. of these methods and compositions are disclosed. That is, while specific reference to each various individual and collective combinations and permutations of these compositions and methods may not be explicitly disclosed, each is specifically contemplated and described herein. For example, if a particular composition of matter or a particular method is disclosed and discussed and a number of compositions or methods are discussed, each and every combination and permutation of the compositions and the methods are specifically contemplated unless specifically indicated to the contrary. Likewise, any subset or combination of these is also specifically contemplated and disclosed.

What is claimed is:

1. An oral product comprising:
    a composition including nicotine; and
    an elastic nonwoven fabric around the composition, the elastic nonwoven fabric including,
        fibers including polyurethane.
2. The oral product of claim 1, wherein the fibers include melt-blown fibers.
3. The oral product of claim 1, wherein the composition includes a tobacco extract including the nicotine.
4. The oral product of claim 1, wherein the composition further includes a non-tobacco material.
5. The oral product of claim 4, wherein the non-tobacco material includes a plant material.
6. The oral product of claim 5, wherein the plant material has an oven volatiles content of greater than or equal to 10 weight percent.
7. The oral product of claim 6, wherein the oven volatiles content ranges from 15 weight percent to 25 weight percent.
8. The oral product of claim 6, wherein the oven volatiles content ranges from 20 weight percent to 30 weight percent.
9. The oral product of claim 6, wherein the oven volatiles content ranges from 30 weight percent to 50 weight percent.
10. The oral product of claim 6, wherein the oven volatiles content ranges from 45 weight percent to 65 weight percent.
11. The oral product of claim 5, wherein the plant material includes thyme, lavender, rosemary, coriander, dill, mint, peppermint, dahlia, cinchona, foxglove, meadowsweet, *Echinacea*, elderberry, willow bark, tea leaves, red clover, coconut flakes, mint leaves, *ginseng*, apple, corn silk, grape leaf, basil leaf, or any combination thereof.
12. The oral product of claim 1, further comprising:
    a pouch including,
        the elastic nonwoven fabric.
13. The oral product of claim 12, wherein the elastic nonwoven fabric has a basis weight ranging from 1 gram per square meter (gsm) to 350 gsm.
14. The oral product of claim 13, wherein the basis weight is 30 gsm.
15. The oral product of claim 13, wherein the basis weight is 21 gsm.
16. The oral product of claim 13, wherein the basis weight is 15 gsm.
17. The oral product of claim 1, wherein the fibers have diameters of less than or equal to 30 microns.
18. The oral product of claim 17, wherein the diameters range from 0.5 microns to 5 microns.
19. The oral product of claim 1, further comprising:
    a flavorant.

* * * * *